United States Patent
Liebelt

(12) 
(10) Patent No.: US 11,346,385 B2
(45) Date of Patent: May 31, 2022

(54) GROMMET

(71) Applicant: Illinois Tool Works Inc., Glenview, IL (US)

(72) Inventor: Scott M. Liebelt, Eau Claire, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/033,554

(22) Filed: Sep. 25, 2020

(65) Prior Publication Data

US 2021/0310509 A1 Oct. 7, 2021

Related U.S. Application Data

(63) Continuation-in-part of application No. 16/501,136, filed on Jul. 10, 2020.

(60) Provisional application No. 63/005,639, filed on Apr. 6, 2020.

(51) Int. Cl.
*H02G 3/22* (2006.01)
*F16B 21/08* (2006.01)

(52) U.S. Cl.
CPC ................................ *F16B 21/084* (2013.01)

(58) Field of Classification Search
CPC .. H02G 3/04; H02G 3/22; H02G 3/24; H02G 3/30; H02G 3/36; H02G 3/00; H02G 3/0487; H02G 15/00; B60R 16/0215; B60R 16/0207; B60R 16/0222; H01R 13/5205; H01R 13/5219; H01B 17/583; F16B 21/084
USPC .... 174/668, 650, 152 G, 153 G, 135, 137 R, 174/72 A, 68.1, 68.3, 142, 151, 17 CT; 16/2.1, 2.2; 248/56; 277/314, 602, 607, 277/628

See application file for complete search history.

(56) References Cited

U.S. PATENT DOCUMENTS

| | | |
|---|---|---|
| 3,164,054 A | 1/1965 | Biesecker |
| D273,091 S | 3/1984 | Kurosaki |
| 4,487,998 A | 12/1984 | Pegram |
| 4,675,937 A | 6/1987 | Mitomi |
| 4,927,287 A | 5/1990 | Ohkawa et al. |
| 4,952,106 A | 8/1990 | Kubogochi et al. |
| 4,953,269 A | 9/1990 | Ragsdale |
| 5,294,225 A | 3/1994 | Kazino et al. |
| 5,375,954 A | 12/1994 | Eguchi |
| 5,435,679 A | 7/1995 | Barry |
| 5,499,737 A | 3/1996 | Kraus |

(Continued)

FOREIGN PATENT DOCUMENTS

| | | |
|---|---|---|
| CN | 106351930 A | 1/2017 |
| DE | 3931180 A1 | 4/1990 |

(Continued)

OTHER PUBLICATIONS

European Search Report from Application No. 20150033.7, dated May 12, 2020. (8 pages).

*Primary Examiner* — Angel R Estrada
(74) *Attorney, Agent, or Firm* — Quarles & Brady LLP

(57) ABSTRACT

A grommet has a body that includes a longitudinal axis and has a passageway therein. The grommet further includes a collar and a box prong. The collar extends from the body and away from the longitudinal axis. The box prong extends circumferentially around the body. A plurality of openings extend through the body and the box prong at diametrically opposed sides. The grommet is configured to attach within a slot of a component in any orientation.

20 Claims, 28 Drawing Sheets

(56) References Cited

U.S. PATENT DOCUMENTS

| | | |
|---|---|---|
| 5,507,610 A | 4/1996 | Benedetti et al. |
| 5,632,581 A | 5/1997 | Hasada |
| 5,795,118 A | 8/1998 | Osada et al. |
| 5,850,676 A | 12/1998 | Takahashi et al. |
| 5,975,820 A | 11/1999 | Kirchen |
| 5,980,180 A | 11/1999 | Schiess |
| 6,364,586 B1 | 4/2002 | Okada |
| 6,431,585 B1 | 8/2002 | Rickabus et al. |
| 6,507,976 B2 | 1/2003 | Ichimaru |
| 6,616,479 B1 | 9/2003 | Jones |
| 7,033,121 B2 | 4/2006 | Kirchen |
| 7,105,750 B1 | 9/2006 | Duhr |
| 7,114,217 B2 | 10/2006 | Matsuzawa et al. |
| 7,207,759 B2 | 4/2007 | Kato |
| 7,690,876 B2 | 4/2010 | Kawai et al. |
| 8,037,582 B2 | 10/2011 | Okada et al. |
| D665,245 S | 8/2012 | Nakazato |
| 8,245,367 B2 | 8/2012 | Kato et al. |
| 8,348,568 B2 | 1/2013 | Murakami |
| 8,572,805 B2 | 11/2013 | Inoue |
| 8,662,807 B2 | 3/2014 | Adachi |
| 8,769,779 B2 | 7/2014 | Lee |
| 8,961,092 B2 | 2/2015 | De Jong et al. |
| 9,061,379 B1 | 6/2015 | Mead et al. |
| 9,115,743 B2 | 8/2015 | Yamamoto |
| 9,303,672 B2 | 4/2016 | Lepper |
| 9,879,707 B2 | 1/2018 | Watanabe |
| D824,747 S | 8/2018 | Briese et al. |
| 10,113,577 B2 | 10/2018 | Kanie |
| 10,396,489 B2 | 8/2019 | Mizuno et al. |
| 10,451,100 B2 | 10/2019 | Flynn |
| 2002/0026693 A1 | 3/2002 | Akema et al. |
| 2002/0094253 A1 | 7/2002 | Enomoto et al. |
| 2004/0013481 A1 | 1/2004 | Jeppesen |
| 2004/0020016 A1 | 2/2004 | Yoneoka |
| 2006/0171793 A1 | 8/2006 | Kawai et al. |
| 2007/0289770 A1 | 12/2007 | Koike |
| 2008/0298925 A1 | 12/2008 | Shinozaki |
| 2010/0162534 A1 | 7/2010 | Kato |
| 2011/0014005 A1 | 1/2011 | Shinozaki |
| 2012/0057948 A1 | 3/2012 | Jeon |
| 2012/0210546 A1 | 8/2012 | Jang et al. |
| 2012/0230796 A1 | 9/2012 | McClure |
| 2014/0047679 A1 | 2/2014 | Lepper et al. |
| 2014/0099156 A1 | 4/2014 | Weber |
| 2016/0348707 A1 | 12/2016 | Wu |
| 2020/0141440 A1 | 5/2020 | Liebelt et al. |
| 2020/0217345 A1 | 7/2020 | Liebelt |

FOREIGN PATENT DOCUMENTS

| | | |
|---|---|---|
| EP | 2719907 A1 | 4/2014 |
| EP | 2722534 A1 | 4/2014 |

GROMMET

CROSS REFERENCE TO RELATED APPLICATIONS

This application is a continuation-in-part of U.S. application Ser. No. 16/501,136, filed on Jul. 10, 2020, and entitled "GROMMET" (originally filed as U.S. Provisional Patent Application No. 63/050,429 for which a "Petition Under 37 C.F.R. § 1.53(c)(3) to Convert Provisional Application to Non-Provisional Application" was filed on Oct. 7, 2020), and claims priority to U.S. Provisional Application 63/005,639, filed on Apr. 6, 2020, each of which are incorporated by reference herein in their entirety.

BACKGROUND OF THE INVENTION

1. Field of the Invention

The present invention relates generally to fasteners and, more particularly, to a grommet that assists in securing one or more components together, such as panels within or around a vehicle that are secured together during the manufacturing process of the vehicle.

2. Description of the Background of the Invention

Fasteners may be used to secure components together. Grommets are a type of fastener that typically comprise a ring or edge strip. Grommets are generally flared or collared on each side to keep them in place, and are often made of metal, plastic, or rubber. In some instances, grommets may be used to prevent tearing or abrasion of pierced materials, to cover sharp edges of piercings, to protect the insulation of wires, cables, or lines being routed therethrough, or for securing components together.

In the automotive context, grommet fasteners may be used to securely connect a first panel to a second panel. Many known grommets are configured to be used in a round hole. As such, many known grommets are unable to be used in a slot or non-circular hole. Further, many prior art grommets require proper orientation prior to attaching the grommet to the slot of the first panel and/or the second panel. Furthermore, many prior art grommets require a high installation force.

A need therefore exists for a grommet that can be used in a slot without the need to properly orientate the grommet during installation. Further, a need exists for a grommet with a low installation force.

SUMMARY OF THE INVENTION

In one aspect, a grommet comprises a body that is defined by a longitudinal axis and has a passageway therein. The grommet further comprises a collar and a box prong. The collar extends from the body and away from the longitudinal axis. The box prong extends circumferentially around the body. A plurality of openings extend through the body and the box prong at diametrically opposed sides. The grommet is configured to attach within a slot of a component in any orientation.

In some embodiments, the plurality of openings are aligned with each other on opposite sides of the grommet. In further embodiments, the plurality of openings extend into the passageway of the body. In other embodiments, the grommet comprises four openings on each side of the body. In some embodiments, the box prong comprises an angled wall that extends from the body. The angled wall extends radially outward from the body and longitudinally toward the collar. The box prong further comprises a top wall that extends radially outward and downward from the body. In further embodiments, the box prong comprises a generally frusto-conical shape, and the diameter of the box prong increases as it extends upwardly toward the collar. In other embodiments, the plurality of openings extend along a longitudinal direction of the grommet.

In another aspect, a grommet comprises a body that is defined by a longitudinal axis and has an inner wall. The grommet further comprises a collar and a box prong. The collar extends from the body and away from the longitudinal axis. The box prong extends circumferentially around the body, and the box prong is configured to flex inwardly toward the longitudinal axis. The grommet also comprises a plurality of openings that extend through the box prong and the body at diametrically opposite sides. Each of the plurality of openings are aligned with each other on opposite sides of the body. The grommet is configured to attach within a non-circular slot of a component in any rotational orientation about the longitudinal axis.

In some embodiments, the body of the grommet comprises windows at diametrically opposed sides of the body. The windows extend through the collar and the body of the grommet. In further embodiments, each of the plurality of openings comprise a top section and an elongated section. The top section is positioned longitudinally above the elongated section. A width of each of the top sections is wider than a width of each of the elongate sections. In other embodiments, the top section of the openings extend into an upper end of the grommet.

In yet another aspect, a fastening system comprises a grommet and a first component that includes a slot that extends therethrough. The grommet includes a body, a collar, a box prong, and a plurality of openings that extend through the box prong and the body at diametrically opposite sides. The body defines a longitudinal axis and has a passageway therein. The collar extends radially outward from the body. The box prong extends circumferentially around the body. The grommet is configured to attach within the slot of the first component in any rotational orientation about the longitudinal axis.

In some embodiments, the slot of the first component is a non-circular slot. In further embodiments, the fastening system further comprise a pin configured to slide through the passageway of the body. The pin is removably attached to the grommet. In other embodiments, the pin includes a first circular flange and a second circular flange near a top end of the pin. A second component is configured to be fixed between the first circular flange and the second circular flange. In some embodiments, the box prong is configured to flex inwardly toward the longitudinal axis during installation.

BRIEF DESCRIPTION OF THE DRAWINGS

The invention will be better understood and features, aspects, and advantages other than those set forth above will become apparent when consideration is given to the following detailed description thereof. Such detailed description makes reference to the following drawings.

Figure 1:
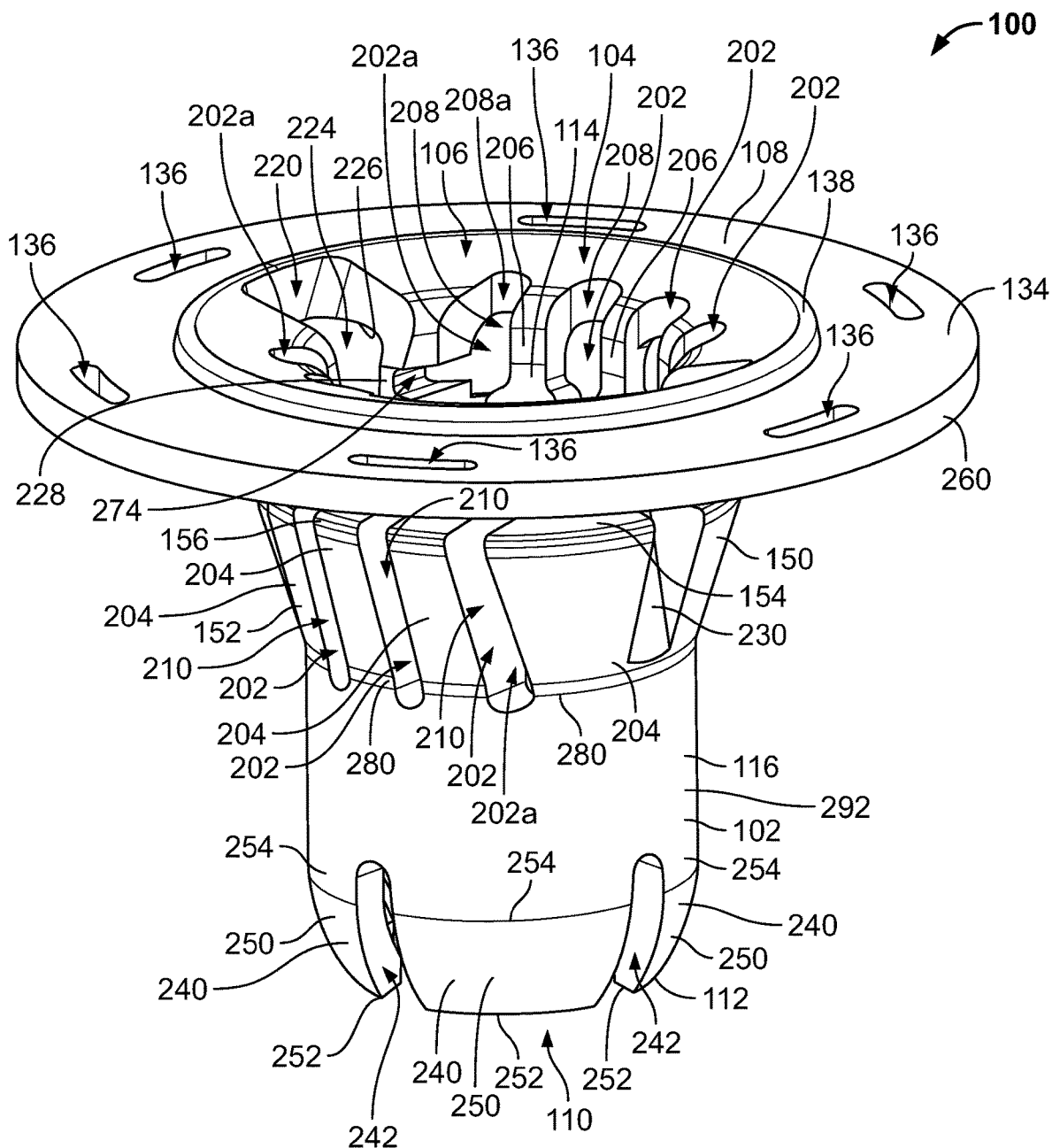
FIG. 1 is a top perspective view of a grommet, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DRAWINGS

Embodiments of the present disclosure provide for a grommet. Specifically, a grommet with a plurality of openings that extend through a box prong. The features described herein allow for the grommet to be inserted quickly into a slot, without the need to be properly orientated within the slot. Therefore, the present disclosure provides for a grommet that greatly reduces the time and complexity of installing it.

Figure 2:
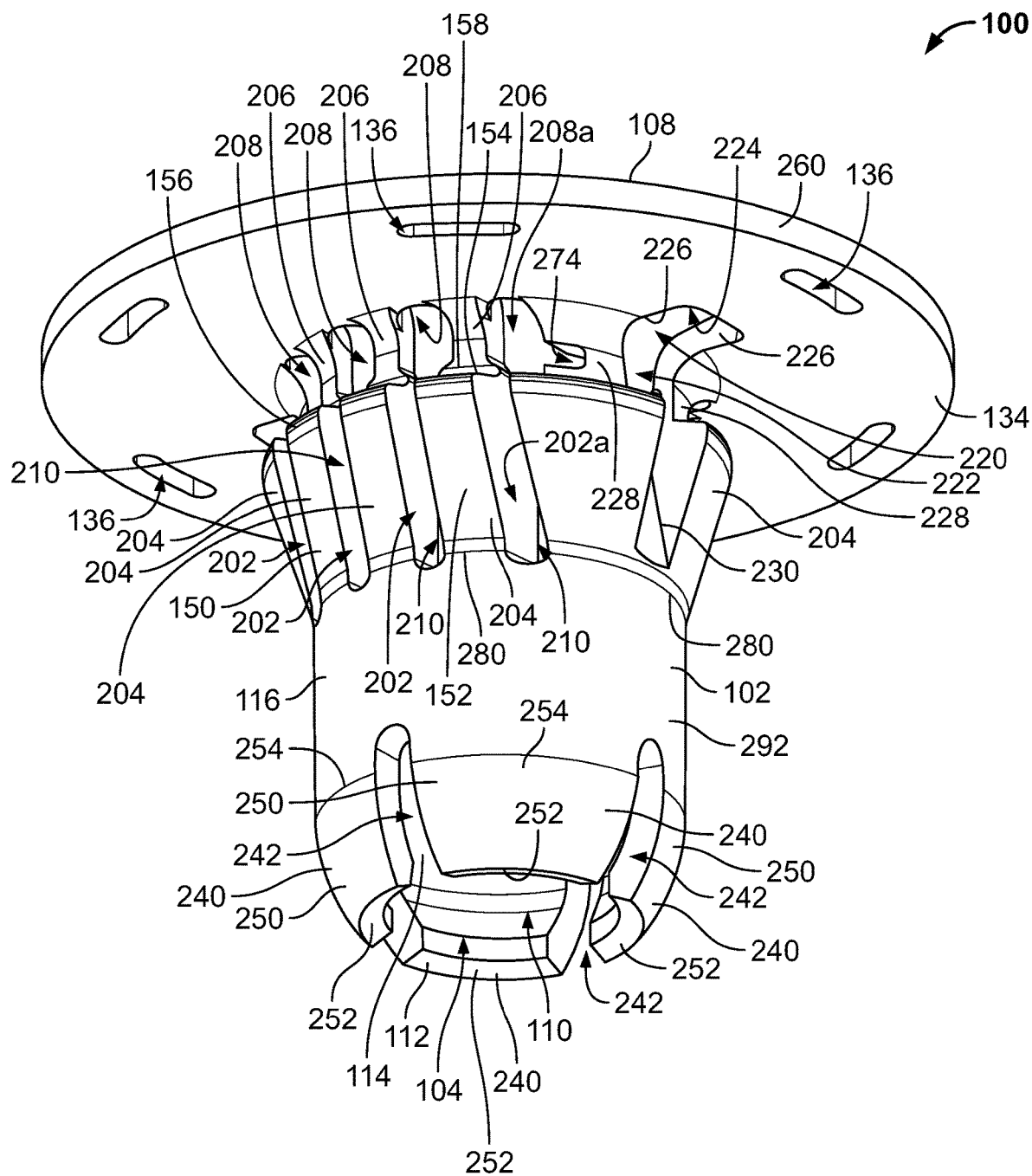
FIG. 2 is a bottom perspective view of the grommet of FIG. 1.
Figure 3:
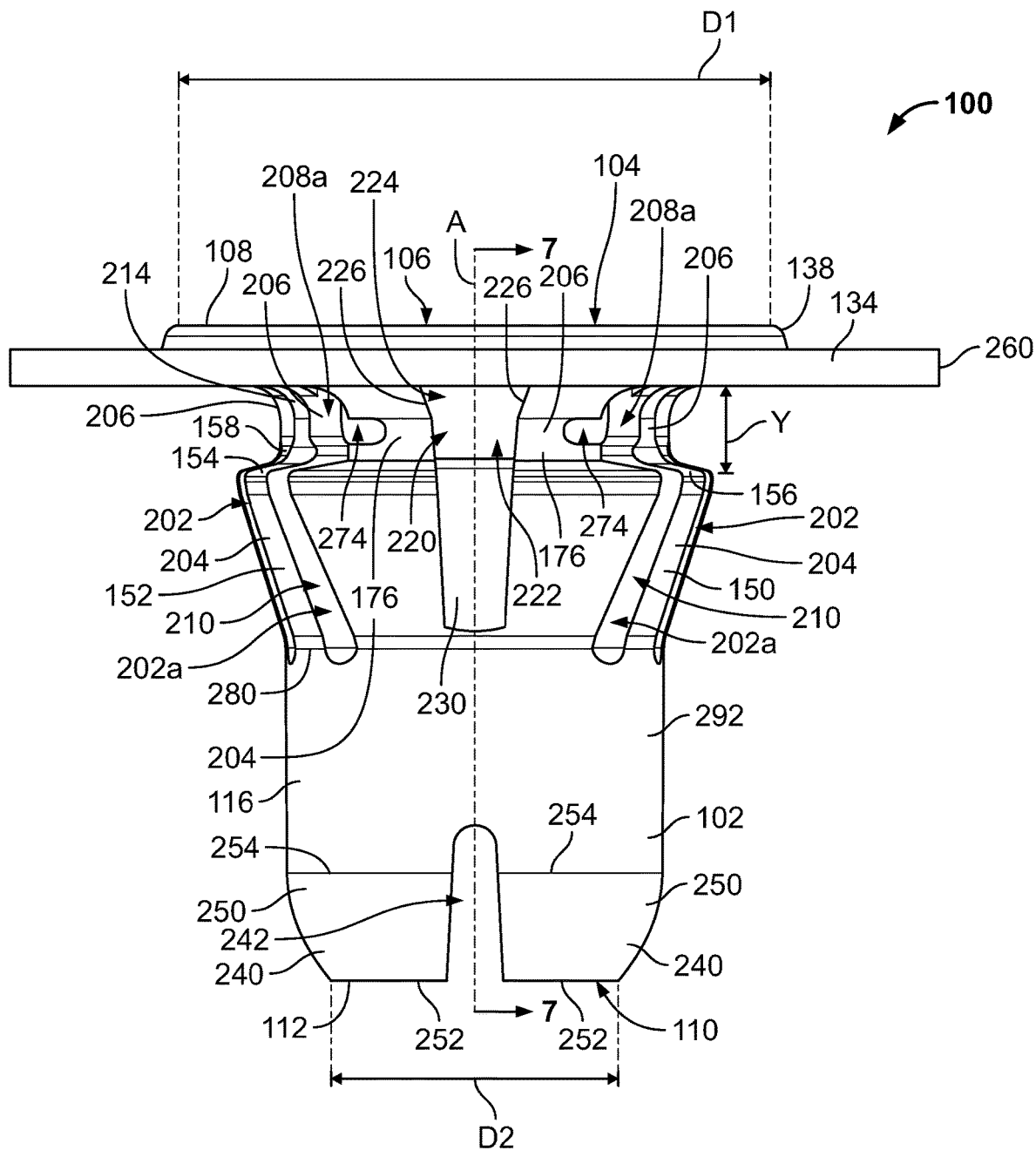
FIG. 3 is a side elevational view of the grommet of FIG. 1.

FIGS. 1-7 illustrate a fastener or grommet 100 in accordance with the present disclosure. Referring to FIGS. 1 and 2, a top and a bottom perspective view of the grommet 100 are shown, respectively. As illustrated in FIG. 1, the grommet 100 comprises a round shape when viewed from the top and bottom, and the grommet 100 includes a body 102 that is generally cylindrical. The grommet 100 may be integrally molded and formed as a single piece of material, such as injection-molded plastic. Further, the grommet 100 includes a passageway 104 defined by a first or upper opening 106 at a first or upper end 108 and a second or lower opening 110 at a second or bottom end 112. The passageway 104 is partially defined by an inner surface 114 of a wall 116 that is generally cylindrical or may be slightly tapered. The wall 116 extends between the upper opening 106 and the lower opening 110, with several interrupted portions, as outlined in greater detail below. Further, in some embodiments, the wall 116 can comprise different thickness levels throughout the grommet 100 (see FIGS. 14 and 17). Referring to FIG. 3, the upper opening 106 has a diameter D1 that is larger than a diameter D2 of the lower opening 110. However, in alternative embodiments, the diameters D1 and D2 can be larger or smaller than shown. Further, a longitudinal axis A extends through a center of the passageway 104.

Referring back to FIG. 1, a collar 134 is disposed peripherally about the upper end 108 of the body 102, and extends radially outward therefrom. A plurality of elongate apertures 136 are provided within the collar 134, which may provide for attachment of the grommet 100 to an object, such as a steel panel (not shown) or sealing element (see FIG. 21). The plurality of elongate apertures 136 may be provided in a number of different configurations, and any number of elongate apertures 136 may be included. Alternatively, the grommet 100 may not include the apertures 136 along the collar 134. A flange 138 extends outwardly from an intersection of the collar 134 and the body 102, in a direction that is substantially parallel with respect to the longitudinal axis A (see FIG. 3).

Referring to FIGS. 1 and 2, a box prong 150 extends outward from the body 102. The box prong 150 extends circumferentially around the body 102 and comprises a generally frusto-conical shape. In particular, the diameter of the box prong 150 increases as it extends upwardly toward the collar 134. As illustrated in FIGS. 1 and 2, the box prong 150 comprises an angled wall 152 that extends from the wall 116 of the body 102. The angled wall 152 extends radially outward from the body 102 and longitudinally toward the collar 134. In alternative embodiments, the box prong 150 may only extend partially around the body 102 of the grommet 100.

Figure 4:
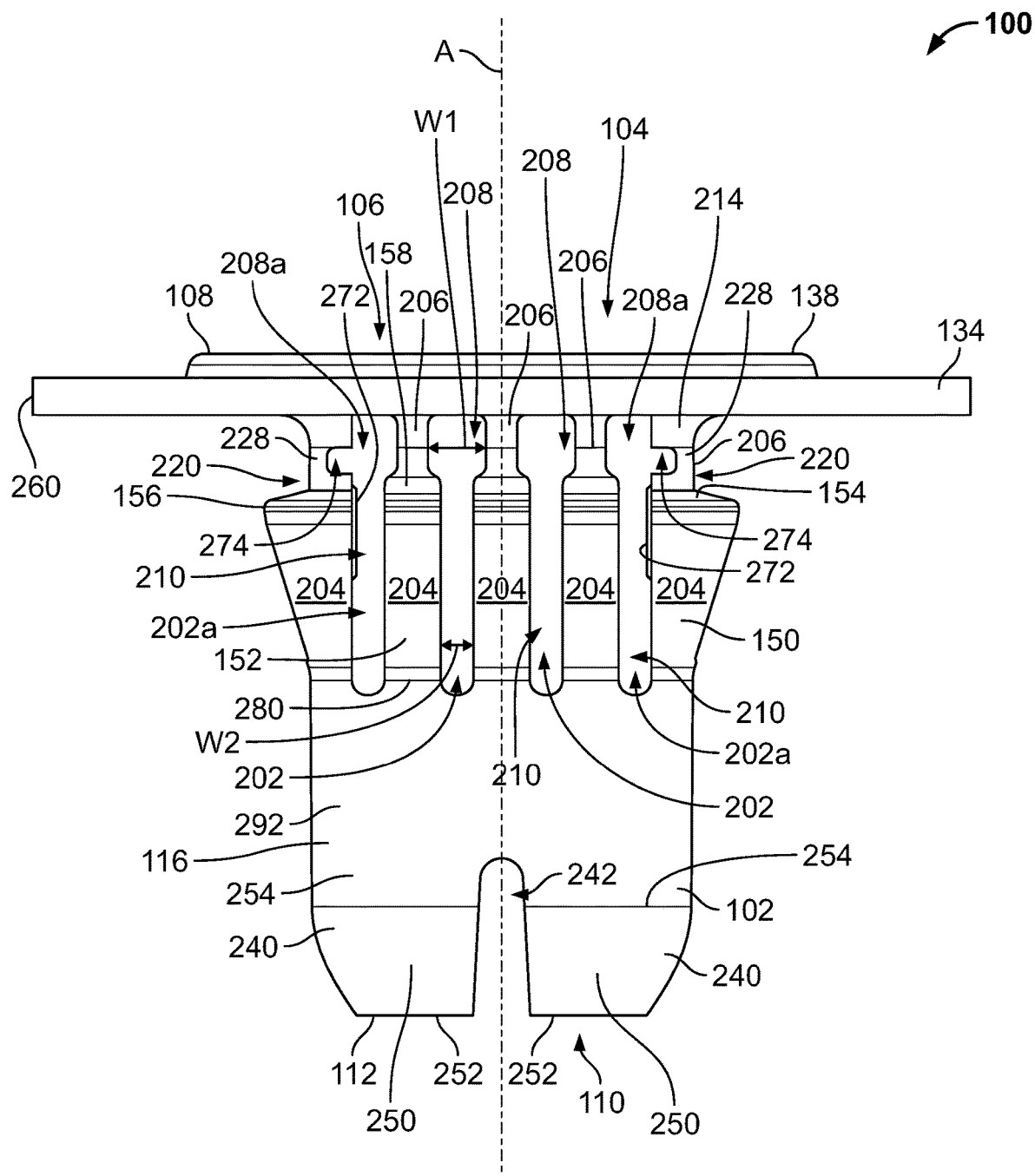
FIG. 4 is a front elevational view of the grommet of FIG. 1.

Referring to FIGS. 3 and 4, a side view and a front elevational view of the grommet 100 are shown. As illustrated in FIGS. 3 and 4, the box prong 150 comprises a top wall 154 that extends radially outward and downward from the wall 116 of the body 102. In the present embodiment, the top wall 154 comprises a slight angle with respect to the collar 134, i.e., the top wall 154 and the collar 134 are not parallel with respect to each other. However, in alternative embodiments, the top wall 154 may be substantially flat or parallel with the collar 134. Additionally, the top wall 154 of the box prong 150 extends from the wall 116 of the body 102 and connects with the angled wall 152 of the box prong 150. In preferred embodiments, the box prong 150 comprises a rounded corner 156 where the top wall 154 and the angled wall 152 meet. Further, as illustrated in FIG. 3, the box prong 150 comprises a rounded wall 158 that connects the top wall 154 of the box prong 150 with the wall 116 of the body 102. However, in alternative embodiments, the top wall 154 may form a sharp or angled corner with the wall 116 of the body 102 (see FIG. 24). As noted herein, the top wall 154 of the box prong 150 is located at a distance Y away from the collar 134 (see FIG. 3).

Referring to FIGS. 1-4, a plurality of openings 202 and, more particularly, longitudinal openings in the present embodiment, extend through the body 102 of the grommet 100 at diametrically opposed front and rear sides. In particular, the plurality of openings 202 extend through the wall 116 of the body 102 and the box prong 150 of the grommet 100. As such, the openings 202 break up the box prong 150 into a plurality of segments 204 and break up the wall 116 of the body 102 into a plurality of ribs 206. In some embodiments, the openings 202 may extend through a portion of the collar 134.

Referring to FIG. 4, the openings 202 are aligned with each other on opposite sides of the body 102 of the grommet 100. In other embodiments, the openings 202 may not align with each other on opposite sides of the body 102 of the grommet 100. As noted herein, the grommet 100 comprises four openings 202 on each side of the body 102. However, in alternative embodiments, the grommet 100 may include more or fewer openings 202 than shown. Further, in other embodiments, the plurality of openings 202 may extend on different sides of the body 102 of the grommet 100.

Referring still to FIG. 4, each of the openings 202 comprise a top section 208 and an elongated section 210. The elongated section 210 extends from the top section 208, which is positioned longitudinally above the elongated section 210. As noted herein, the top sections 208 of the openings 202 comprise a width W1 and the elongated sections 210 of the openings 202 comprise a width W2. As illustrated in FIG. 4, the width W1 of the top sections 208 are wider than the width W2 of the elongated sections 210. Put differently, the top sections 208 of the plurality of openings 202 cause portions of the plurality of ribs 206 to be thinner and comprise a decreased thickness. As such, the top section 208 of the plurality of openings 202 and the decreased thickness of the plurality of ribs 206 reduce the installation force necessary to install the grommet 100. As noted herein, outermost openings 202a include a thinner top section 208a than the other openings 202. In some embodiments, all of the top sections 208 of the openings 202 may comprise the same width. In alternative embodiments, the top sections 208 of the plurality of openings 202 may comprise the same width as the elongated sections 210 such that the width is consistent throughout the openings 202, i.e., W1=W2 (see FIG. 25).

Referring still to FIG. 4, the openings 202 extend along the longitudinal direction, i.e., along the longitudinal axis A, of the grommet 100. It is contemplated that the openings 202 may not extend in a longitudinal direction or along the longitudinal axis A. For example, in some embodiments, the openings 202 may be angled with respect to the longitudinal axis A. In further embodiments, the openings 202 may not extend along a straight line. For example, the openings may comprise a zig zag or squiggle pattern. Furthermore, the length and width of each opening 202 may be larger or smaller than shown.

Referring back to FIG. 2, the body 102 of the grommet 100 is shown more clearly, and a fillet 214 that forms a connection between the collar 134 and the body 102 is illustrated. The fillet 214 extends radially about the longitudinal axis A (see FIG. 3), and is interrupted at various points by the openings 202 in the body 102 of the grommet 100. Further, the fillet 214 is interrupted at diametrically opposed sides by windows 220 that define openings within the body 102 of the grommet 100. While the present embodiment includes two of the windows 220, the same reference numbers apply to like elements of each of the windows 220 as described hereinafter below. As such, only a single window 220 is described and referred to herein, however, the windows 220 are identical, and the description of one relates to the description of the other.

Still referring to FIG. 2, the window 220 extends from the collar 134 toward the bottom end 112 of the body 102. As illustrated in FIG. 3, the window 220 comprises a central segment 222 and a top portion 224 that is defined by intermediate sides 226 of the body 102. The top portion 224 extends above the central segment 222. In this embodiment, the window 220 extends through the collar 134, the fillet 214, and a portion of the wall 116 of the body 102. As further illustrated in FIG. 3, a portion 228 of the wall 116 of the body 102 extends on each side of the window 220. However, in alternative embodiments, the window 220 may extend into the openings 202 (see FIGS. 24 and 25). As noted herein, the windows 220 allow the grommet 100 to have a lower installation force. In alternative embodiments, the grommet 100 may not comprise the windows 220 on each side of the grommet 100. In such an embodiment, the wall 116 of the body 102 may extend all the way up to the fillet 214 (see FIG. 3). Referring specifically to FIG. 3, a cutout 230 extends into the box prong 150 on diametrically opposed sides of the box prong 150. The cutout 230 has a generally rectangular shape and extends down toward the bottom of the box prong 150. In some embodiments, the cutout 230 can assist with removal of the grommet 100 after installation. It is contemplated that the cutout 230 can be larger or smaller than shown. In some embodiments, the box prong 150 may not include the cutout 230.

Referring to FIG. 2, a plurality of legs 240 extend from the body 102 adjacent the lower opening 110. The legs 240 are separated by a plurality of longitudinal slits 242, which generally define the legs 240. In preferred embodiments, the grommet 100 may include four of the legs 240 that extend from the body 102. Alternatively, the grommet 100 may include more or fewer legs 240 than shown. Each of the legs 240 may include an extension beam 250 and an inwardly-canted tip 252 extending from the extension beam 250. In operation, the securing legs 240 are configured to outwardly and/or inwardly pivot about flexure joints 254 that connect the legs 240 with the body 102 as a tool or other object is moved into the central passageway 104. In some embodiments, the securing legs 240 are capable of pivoting outwardly at the flexure joints 254 to expand in order to secure the grommet 100 into an opening of a component, such as a panel.

Referring to FIGS. 3 and 4, the collar 134 is shown in elevation, the collar 134 being generally cylindrical in nature and having a peripheral side 260 that extends in a direction parallel with respect to the longitudinal axis A. As described in greater detail hereinafter below, the box prong 150 is flexible and is formed to retract into the passageway 104 of the grommet 100 when drawn therein through a first component 270 (see FIG. 9). Put differently, the box prong 150 is capable of flexing or deforming radially inwards toward the longitudinal axis A. An intersection or joint 280 between the box prong 150 and the body 102 is generally flexible, and allows the box prong 150 to retract inward, once a force is applied.

Referring to FIG. 4, the box prong 150 comprises supports 272 on both sides of the box prong 150. The supports 272 are positioned adjacent or on the inner surface 114 of the wall 116, and the supports 272 add additional material to the back side of the box prong 150. The supports 272 help counteract additional forces yielded to the grommet 100. In alternative embodiments, the grommet 100 may not include the supports 272 (see FIG. 25). In further embodiments, the supports 272 may be positioned on the front and back side of the grommet 100 instead of on the right and left sides (see FIG. 4).

Referring still to FIG. 4, the grommet 100 comprises grooves 274 that extend into a portion 228 of the wall 116 of the body 102. In particular, the grooves 274 are positioned on both sides of the windows 220 and connect with the outer most openings 202a. In particular, the grooves 274 connect with the top section 208 of the outer most openings 202a. As illustrated in FIG. 4, the grooves 274 only extend partially through the portion 228 of the wall 116. Instead, the portion 228 of the wall 116 extends upwardly from the box prong 150 to the collar 134. The portion 228 of the wall 116 connects the box prong 150 to the collar 134 and equalizes the installation force in all orientations. Further, the portion 228 of the wall 116 allows the grommet 100 to be more rigid. In alternative embodiments, the portion 228 of the wall 116 and the grooves 274 may not be included. Rather, as discussed above, the windows 220 may extend through the wall 116 to the openings 202 (see FIG. 25).

Figure 5:
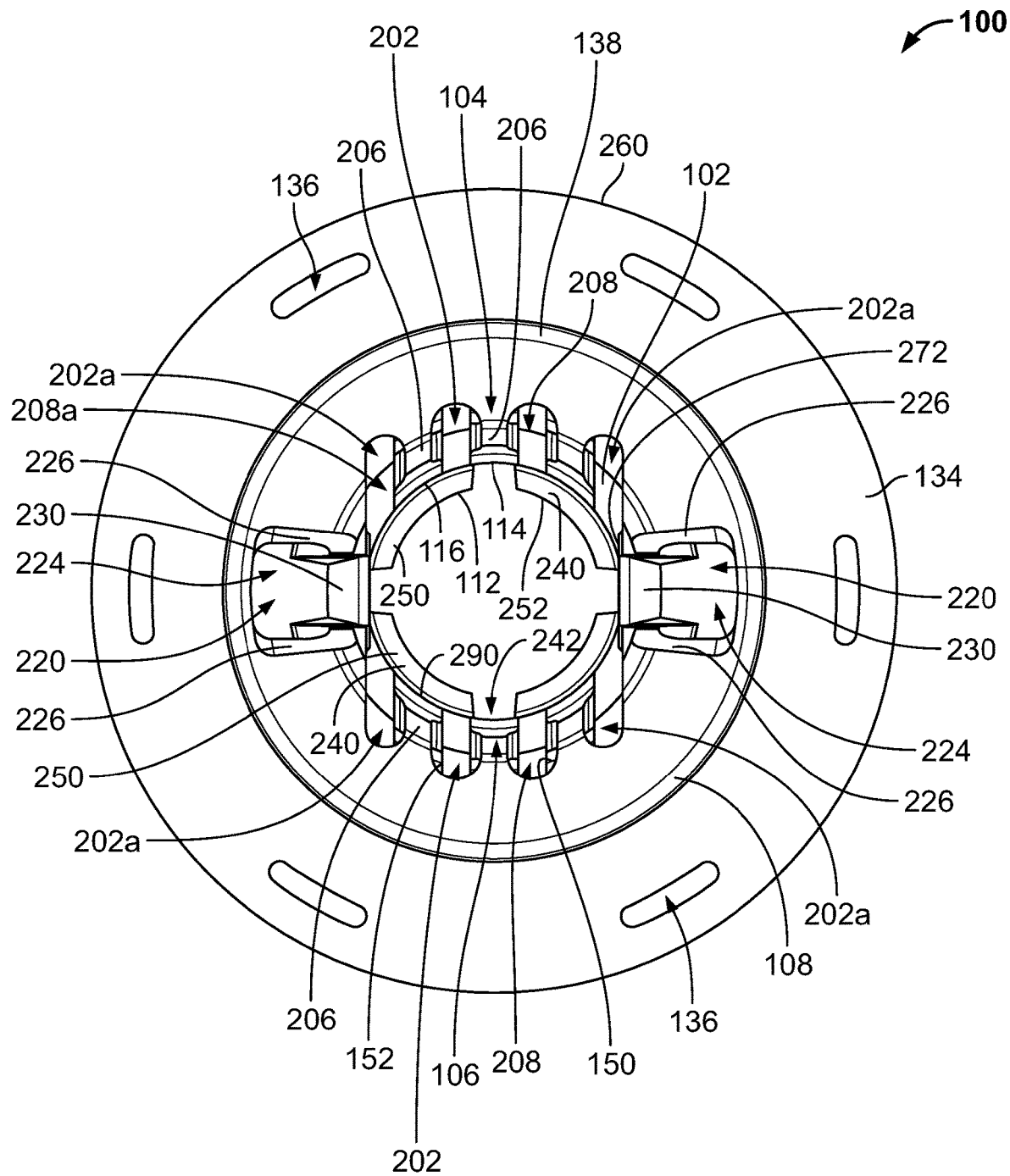
FIG. 5 is a top plan view of the grommet of FIG. 1.
Figure 6:
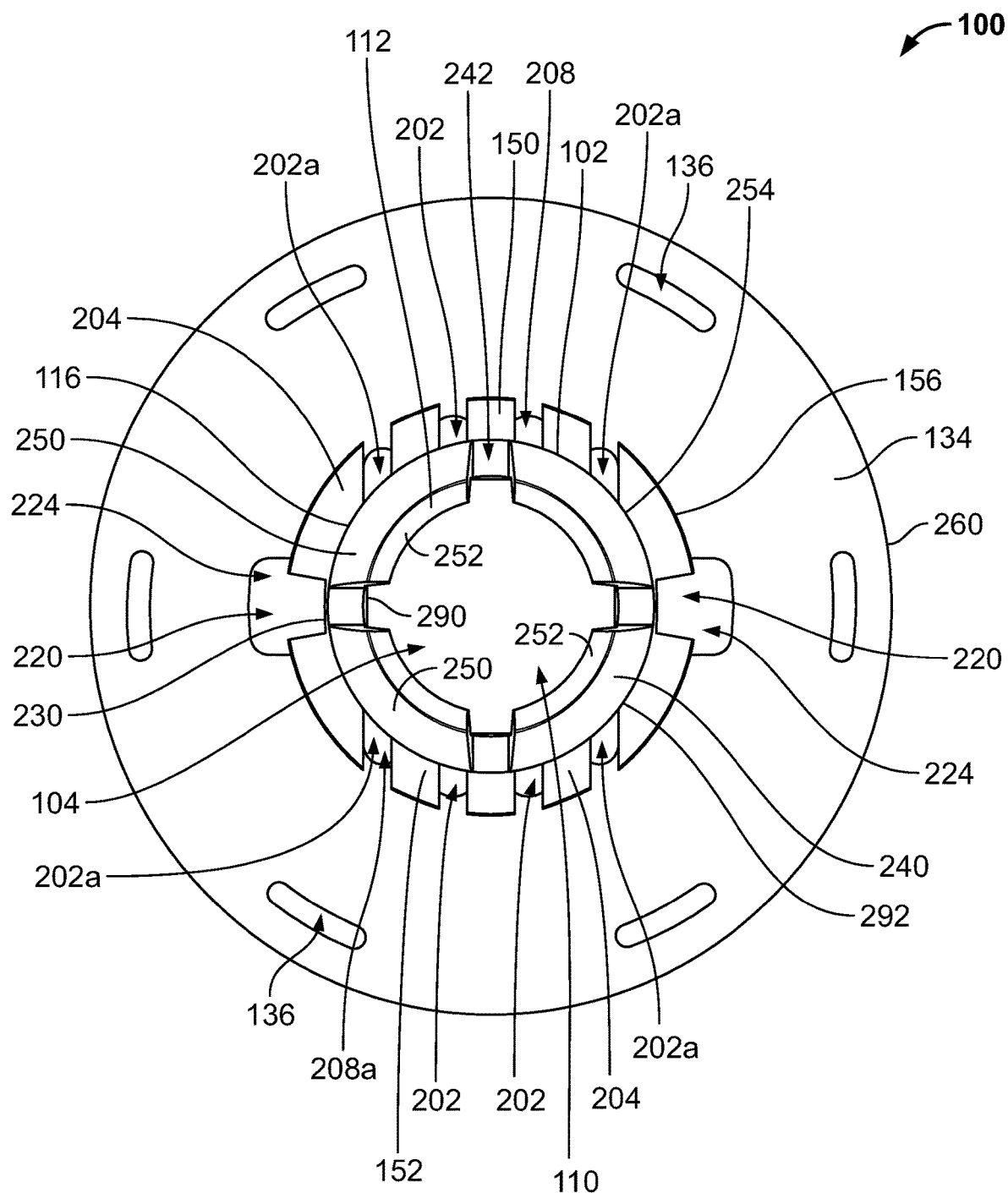
FIG. 6 is a bottom plan view of the grommet of FIG. 1.

Referring to FIGS. 5 and 6, a top and a bottom plan view of the grommet 100 are shown, respectively. Referring specifically to FIG. 5, the plurality of openings 202 also extend through the upper end 108 of the grommet 100. As illustrated in FIG. 5, the top section 208 of the openings 202 extend into the upper end 108 of the grommet 100. As discussed above, the top sections 208 of the openings 202 comprise a larger width than the elongated sections 210 of the openings 202. The increased width of the top sections 208 of the openings 202 reduce the installation force during installation. In alternative embodiments, the top section 208 of the openings 202 may be larger or smaller than shown. As illustrated in FIG. 6, the angled wall 152 of the box prong 150 can be clearly seen extending from the body 102 of the grommet 100.

Figure 7:
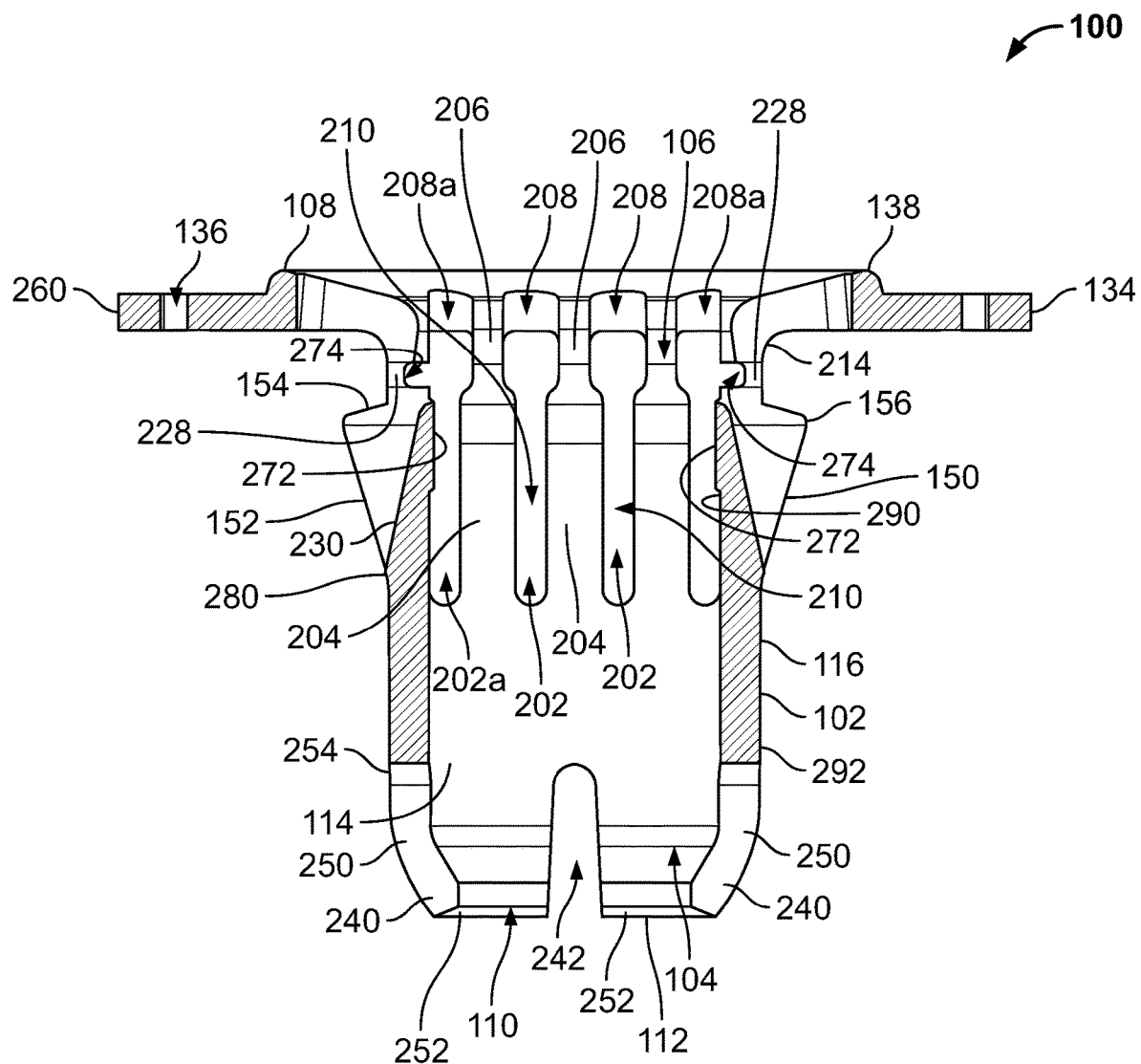
FIG. 7 is a cross-sectional view taken through line 7-7 of FIG. 3.

Referring to FIG. 7, a cross-sectional view of the grommet 100 is shown. Specifically, the box prong 150 is shown extending outward from the joints 280, away from the longitudinal axis A (see FIG. 3). The grommet 100 of FIG. 7 is shown in a non-retracted, first state. The box prong 150 includes an inner surface 290 that is generally flush with the inner surface 114 of the wall 116 in the first state. The angled wall 152 of the box prong 150 is offset with respect to an outer surface 292 of the body 102 in the first state, and is generally flush and coincident with the outer surface 292 of the body 102 in a second, or retracted state. As illustrated in FIG. 7, the grooves 274 and the supports 272 are more clearly illustrated. In alternative embodiments, the grommet 100 may include arms instead of or with the box prong 150 similar to the type disclosed in U.S. patent application Ser. No. 16/722,730 and United States Patent Publication No. 2020/0141440, which are incorporated herein by reference in their entirety.

Figure 8:
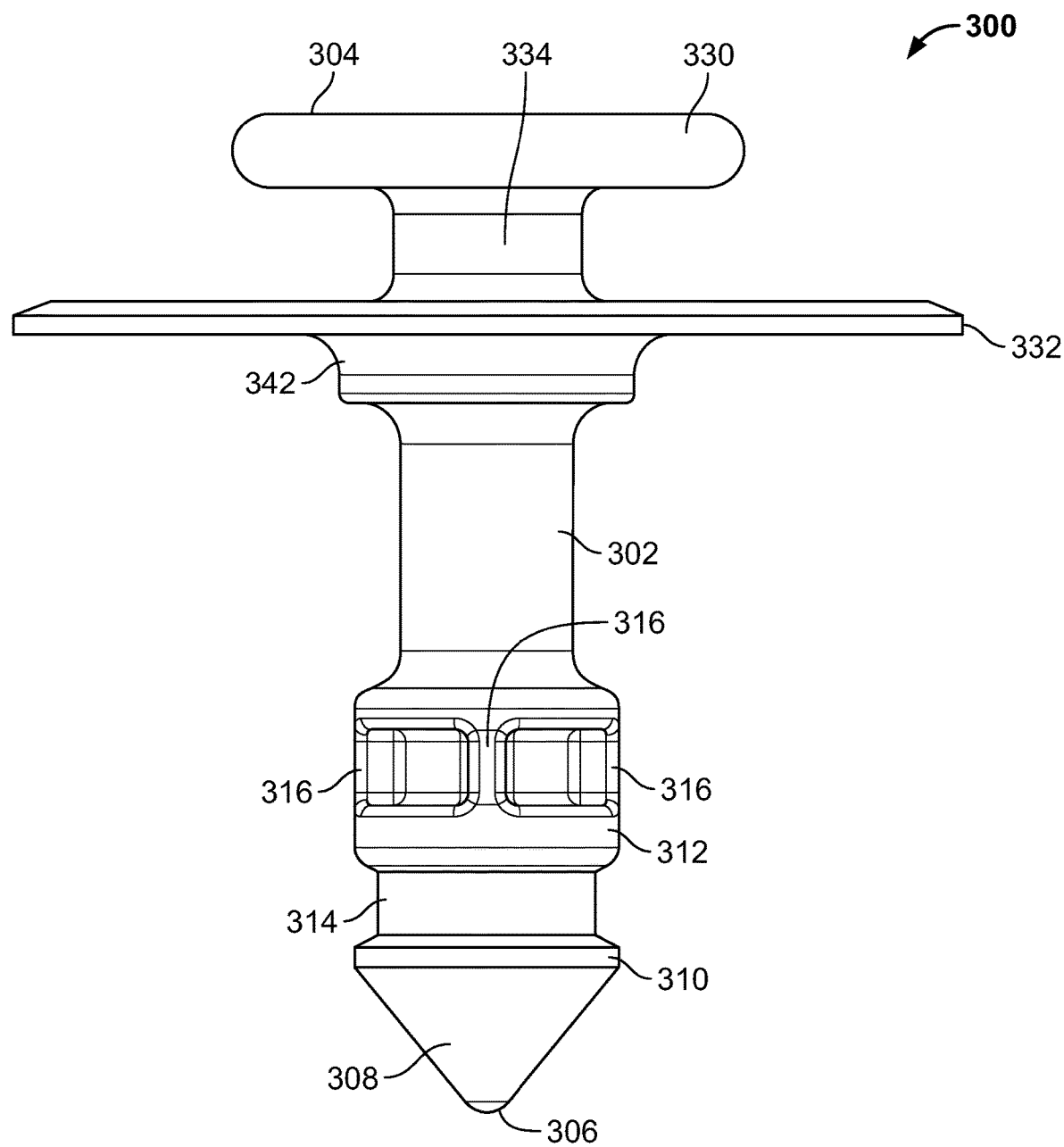
FIG. 8 is a side elevational view of a pin in accordance with the present disclosure.

Referring to FIG. 8, a side elevational view of a pin 300 is shown. As illustrated in FIG. 8, the pin 300 comprises a body 302 that includes a top end 304 and a bottom end 306. The body 302 further includes a conical tip 308 at the bottom end 306 of the pin 300. The conical tip 308 extends from the bottom end 306 of the pin 300 to a perimeter wall 310. The perimeter wall 310 is generally cylindrical; however, the perimeter wall 310 may comprise any shape. Furthermore, the pin 300 includes a rib 312 extending outwardly from the body 302. In preferred embodiments, the body 302 of the pin 300 includes a recessed wall 314 that extends between the rib 312 and perimeter wall 310. The rib 312 also comprises a plurality of reinforcements 316 that extend around the rib 312 of the pin 300. The rib 312 and the reinforcements 316 provide greater support to the body 302 of the pin 300 during pin extraction. In some embodiments, the pin 300 may not comprise the reinforcements 316 and may instead comprise a smaller rib 312 (see FIG. 20).

Referring still to FIG. 8, the pin 300 also includes a first circular flange 330 and a second circular flange 332 near the top end 304 of the body 302. In particular, the first circular flange 330 is positioned above the second circular flange 332, and the first circular flange 330 and the second circular flange 332 are connected by a neck 334. The first and second circular flanges 330, 332 are generally flat. In preferred embodiments, a second component 340 (see FIG. 21), such as a panel, may be attached to the pin 300 on the neck 334. In particular, the second component 340 (see FIG. 21) can be fixed between the first circular flange 330 and the second circular flange 332. As illustrated in FIG. 8, the body 302 of the pin 300 further comprises a shoulder section 342 positioned below the second circular flange 332. The shoulder section 342 comprises a greater thickness than the body 302 of the pin 300. The shoulder section 342 allows more clearance for the grommet 100 to compress during installation.

Figure 9:
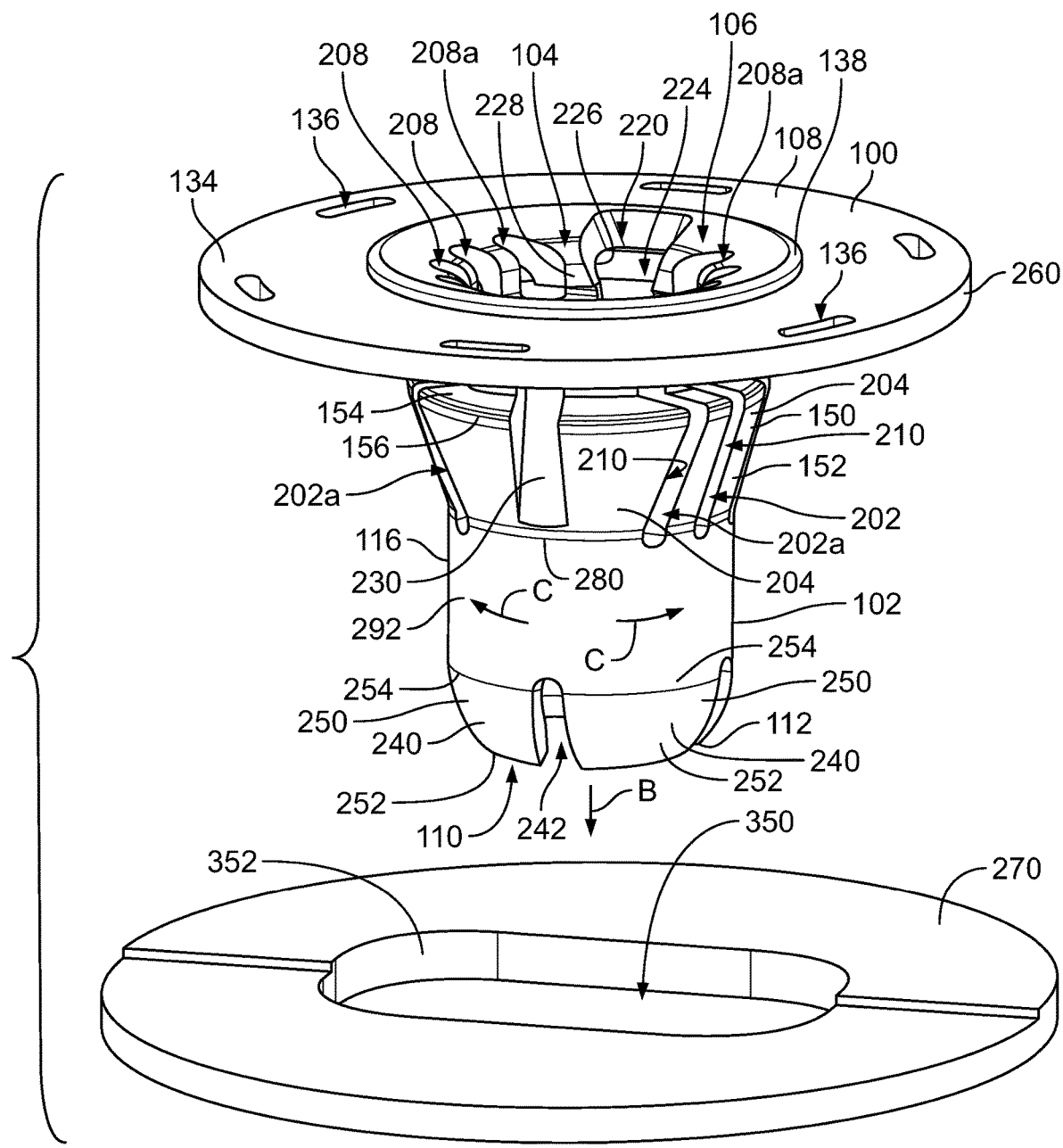
FIG. 9 is a perspective view of the grommet of FIG. 1 aligned with a first component.

Referring to FIG. 9, a perspective view of the grommet 100 and the first component 270 is shown. As illustrated in FIG. 9, the first component 270 comprises a slot 350 that extends therethrough. The slot 350 comprises a generally rectangular or racetrack shape, and the slot 350 is defined by internal edges 352 of the first component 270. In alternative embodiments, the slot 350 may comprise any type of non-circular or circular shape. It is contemplated that the first component 270 may comprise any size, thickness, or configuration. Further, the first component 270 can be any shape and may comprise any type of panel, such as a plastic panel, an aluminum panel, or a metal panel, for example.

Referring still to FIG. 9, during assembly, the grommet 100 is aligned with the slot 350 of the first component 270. Once aligned, the grommet 100 is urged into the slot 350 in the direction of arrow B. Upon urging of the grommet 100, the legs 240 guide the grommet 100 into a centered position with respect to the slot 350 by aligning with the internal edges 352 of the slot 350. The internal edges 352 of the slot 350 can slide over the extension beam 250 of the legs 240, resulting in the body 102 of the grommet 100 sliding through the slot 350 of the first component 270.

Referring still to FIG. 9, the grommet 100 is allowed to easily slide through the slot 350 of the first component 270 until the internal edges 352 of the slot 350 make contact with the angled wall 152 of the box prong 150. As an operator increases the force on the grommet 100 in the direction of arrow B, the box prong 150 will begin to flex inwardly toward the longitudinal axis A (see FIG. 3). The box prong 150 is able to inwardly flex because of the plurality of openings 202 that extend through the box prong 150 and the body 102 of the grommet 100. Upon a continued increase of force on the grommet 100, the internal edges 352 of the slot 350 begin to slide over the angled wall 152 of the box prong 150, causing further deflection of the box prong 150 in the direction toward the longitudinal axis A (see FIG. 3). The box prong 150 will continue to flex inwardly until the angled wall 152 of the box prong 150 is generally flush and coincident with the outer surface 292 of the body 102, i.e., the retracted state. As the internal edges 352 of the slot 350 ride over the rounded corner 156 of the box prong 150, the box prong 150 flexes back to an at-rest configuration, i.e., the non-retracted state. Therefore, the internal edges 352 that define the slot 350 are trapped between the top wall 154 of the box prong 150 and the collar 134 of the grommet 100 (see FIG. 11).

As will be discussed in further detail herein, the configuration of the box prong 150 and the plurality of openings 202 allow the grommet 100 to be inserted into a non-circular slot, i.e., the slot 350, in any orientation. Therefore, the grommet 100 does not need to be rotated about the longitudinal axis A to a specific orientation before the grommet 100 is inserted into the slot 350 of the first component 270. As such, the grommet 100 can be rotated in the direction of arrows C (see FIGS. 9 and 10) to any orientation prior to insertion into the slot 350. As noted herein, the grommet 100 can be used with any type of non-circular slot. However, it is anticipated that in some embodiments, a circular slot may be used.

Figure 10:
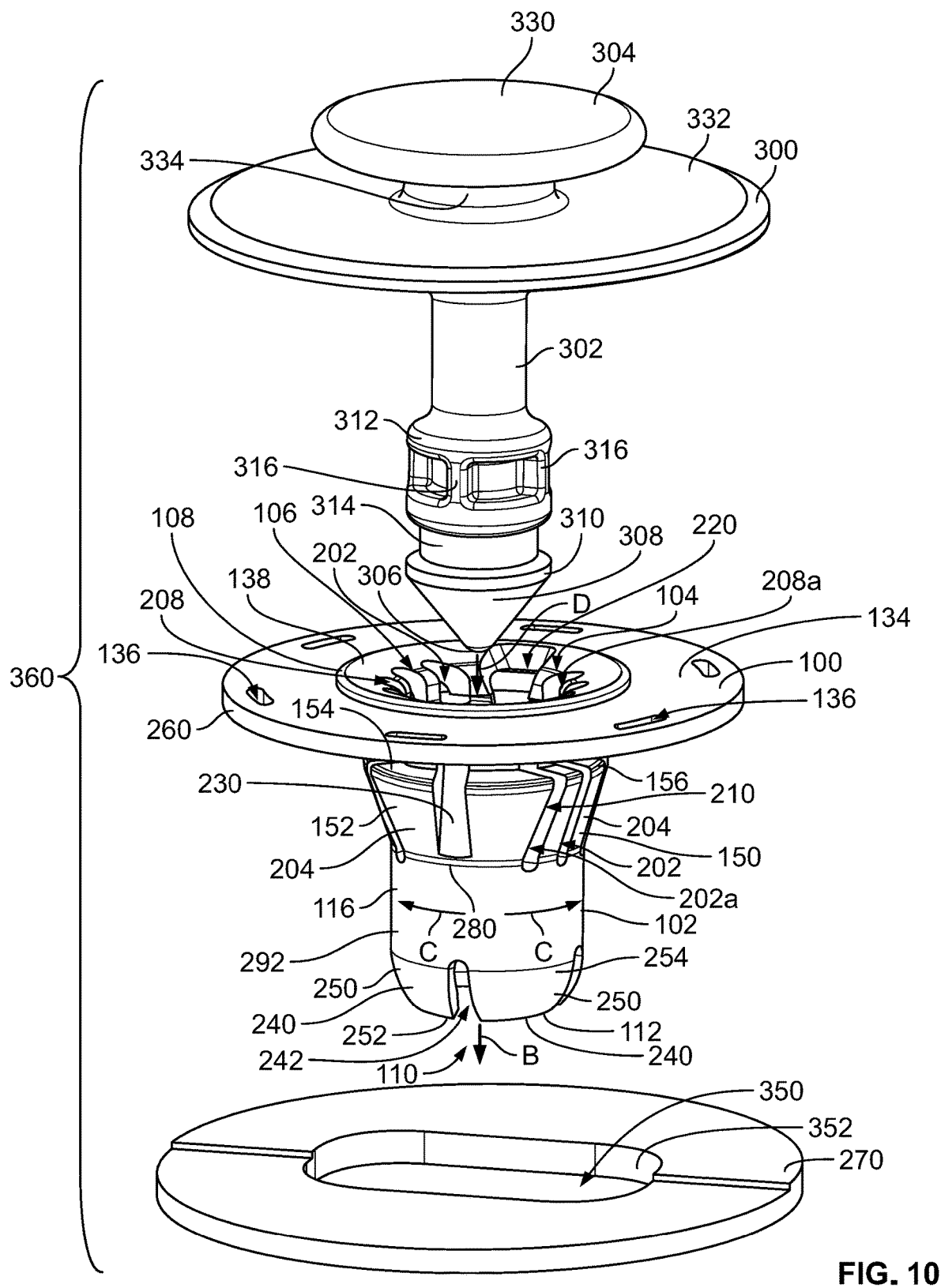
FIG. 10 is an exploded view of a fastening system.

Referring to FIG. 10, an exploded view of a fastening system 360 is shown. In particular, the grommet 100 is aligned with the first component 270 and the pin 300. As noted herein, the grommet 100, the pin 300, and the first component 270 comprise the fastening system 360. As illustrated in FIG. 10, the pin 300 is aligned above the upper opening 106 of the passageway 104 of the grommet 100. In particular, the conical tip 308 of the pin 300 is positioned directly above the upper opening 106 of the passageway 104. During assembly, the pin 300 and the grommet 100 are aligned as illustrated in FIG. 10. Once aligned, the pin 300 is urged into the upper opening 106 of the passageway 104 in the direction of arrow D. Upon urging of the pin 300, the conical tip 308 guides the pin 300 into a centered position with respect to the upper opening 106 of the passageway 104 by aligning with the inner surface 114 of the wall 116. After the pin 300 is aligned, the pin 300 may slide through the passageway 104 of the grommet 100.

Referring still to FIG. 10, the pin 300 is allowed to easily slide through the passageway 104 of the grommet 100 until the conical tip 308 of the pin 300 makes contact with the legs 240 of the grommet 100. As the operator increases the force on the pin 300 in the direction of the arrow D, the legs 240 of the grommet 100 will begin to flex outwardly due to the shape of the conical tip 308 of the pin 300. In particular, the inwardly-canted tip 252 of the legs 240 will ride along the surface of the conical tip 308 of the pin 300. As discussed above, the legs 240 are capable of pivoting outwardly at the flexure joints 254. As the legs 240 of the grommet 100 ride over the perimeter wall 310 of the pin 300, the legs 240 of the grommet 100 flex back to an at-rest configuration on the recessed wall 314. Therefore, the legs 240 of the grommet 100 are trapped between the conical tip 308/perimeter wall 310 and the rib 312 of the pin 300 (see FIG. 13). Specifically, the inwardly-canted tip 252 of the legs 240 are secured to the body 302 of the pin 300 adjacent to the recessed wall 314 (see FIG. 13). As noted herein, the pin 300 is capable of being detached from the grommet 100.

Figure 11:
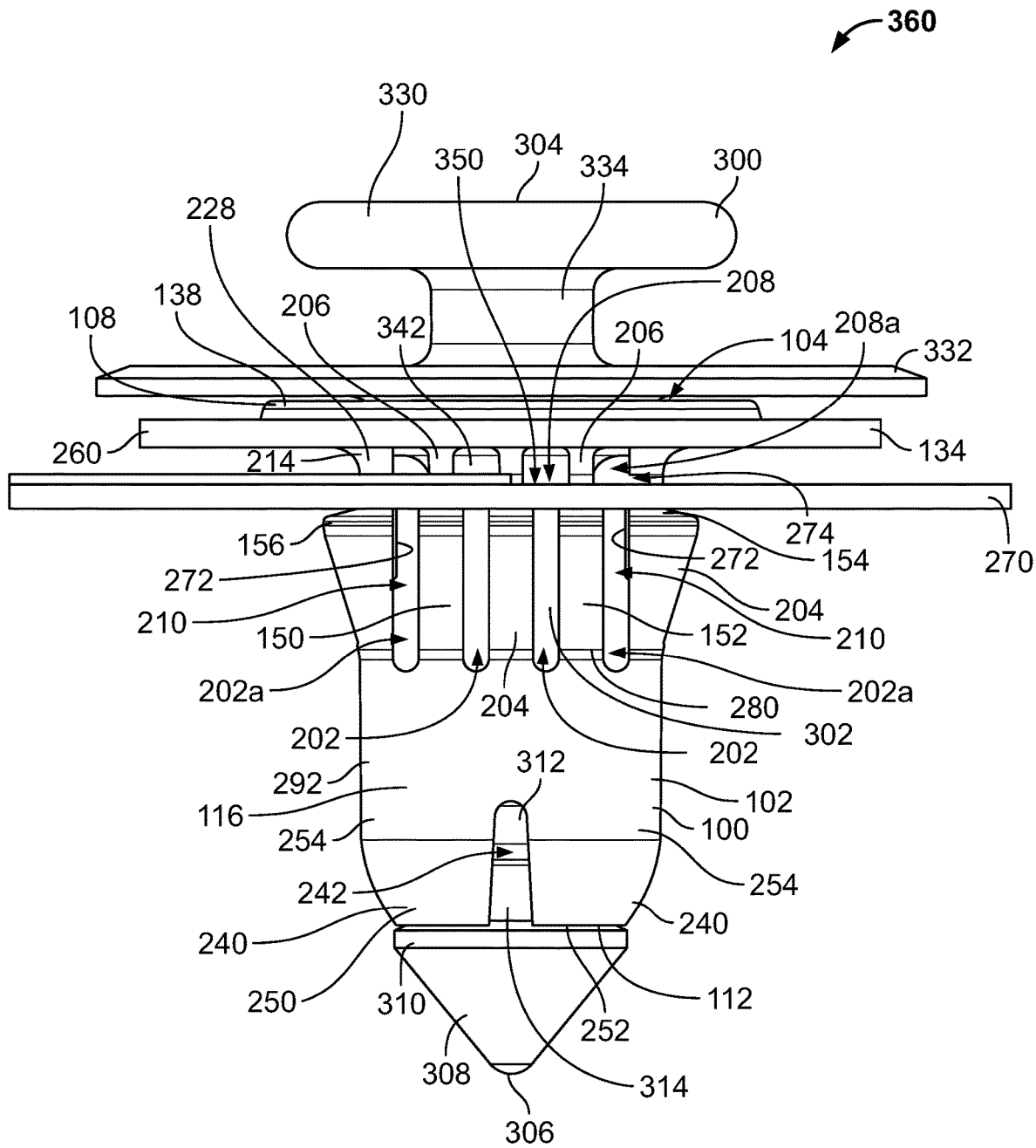
FIG. 11 is front elevational view of the fastening system of FIG. 10.
Figure 12:
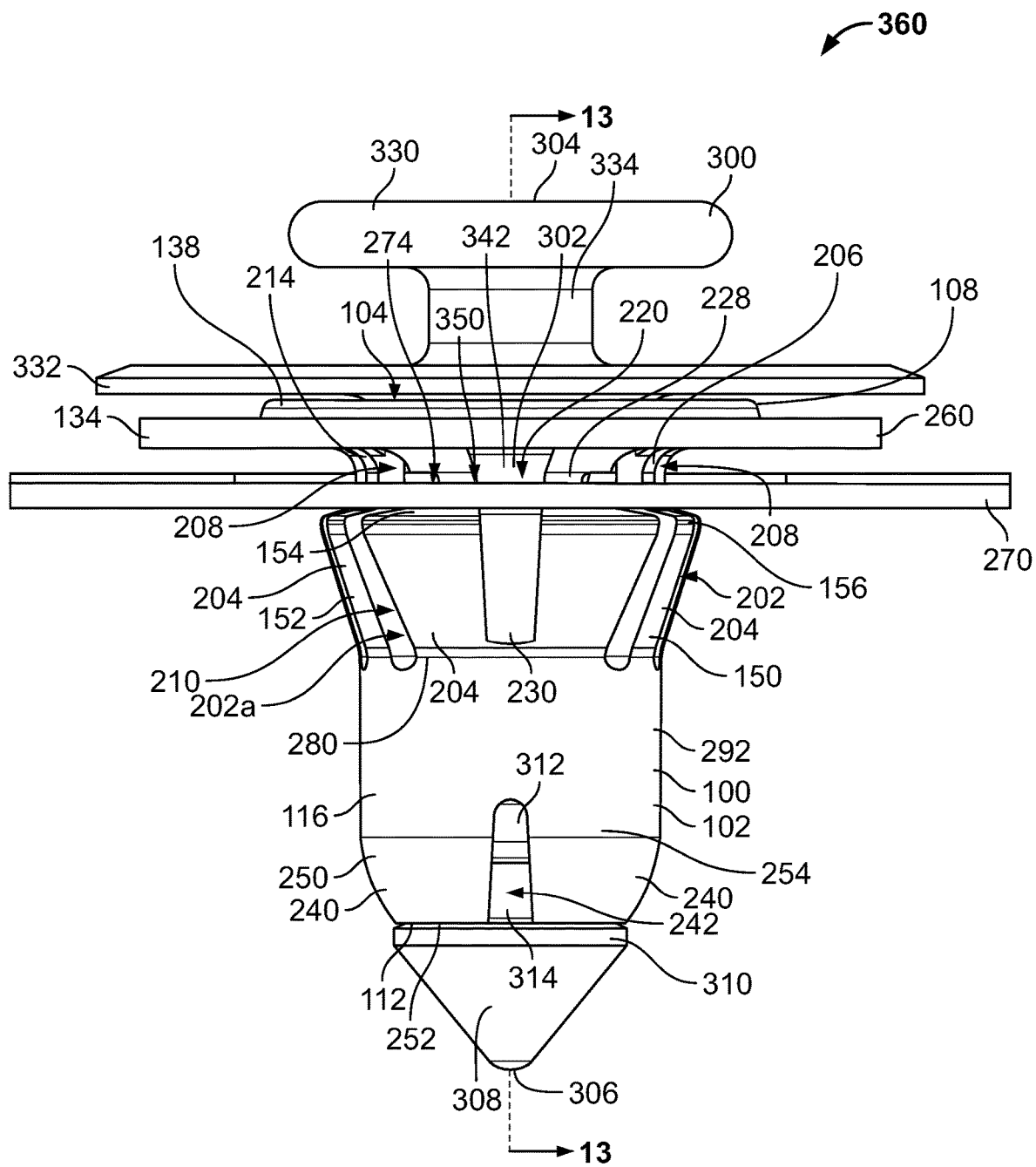
FIG. 12 is a side elevational view of the fastening system of FIG. 10.
Figure 13:
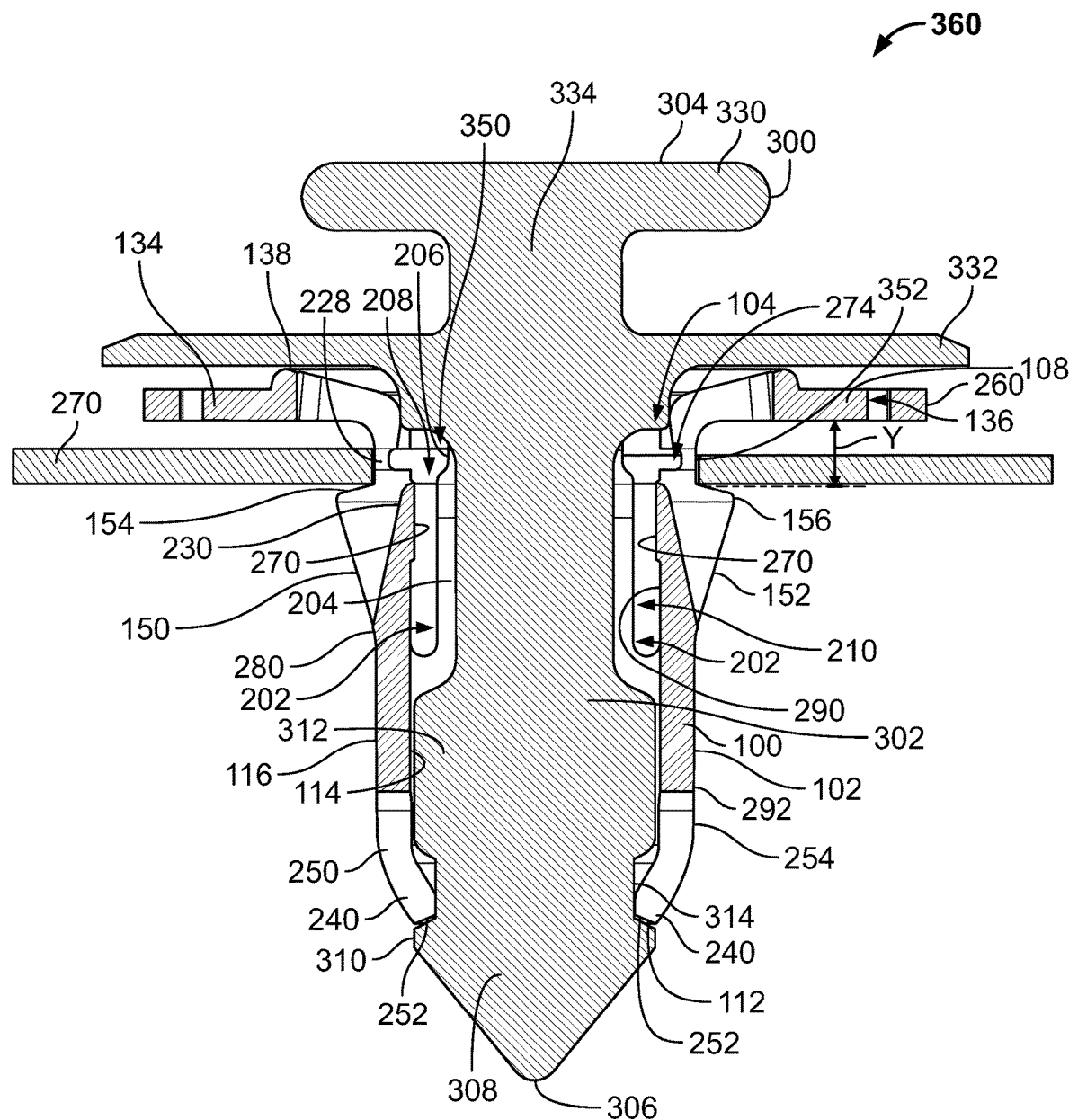
FIG. 13 is a cross-sectional view of the fastening system of FIG. 10 taken through line 13-13 of FIG. 12.

Referring to FIGS. 11-13, various views of the fastening system 360 are shown. In particular, the grommet 100 is attached to the pin 300 and the first component 270. As illustrated in FIGS. 11-13, the first component 270 is positioned between the collar 134 and the top wall 154 of the box prong 150. As noted herein, the pin 300 can be inserted into the grommet 100 prior to the grommet 100 being attached to the first component 270. In further embodiments, the pin 300 and the grommet 100 may be shipped to the operator already assembled and attached to each other. In other embodiments, the pin 300 may be inserted into the grommet 100 after the grommet 100 has been attached to the first component 270. As discussed above, in some embodiments, the pin 300 is removably attached to the grommet 100 such that the pin 300 and the grommet 100 may be shipped together to the operator attached, but disassembled thereafter prior to being inserted into a vehicle, for example.

Referring still to FIGS. 11-13, the second circular flange 332 is positioned above the collar 134 of the grommet 100. In alterative embodiments, the second circular flange 332 may be flush with the collar 134 of the grommet 100. As discussed above, the first component 270 may comprise any type of thickness. Therefore, depending on the thickness of the first component 270 the distance Y between the top wall 154 of the box prong 150 and the collar 134 may vary to accommodate the thickness of the component (see FIG. 13). In preferred embodiments, the distance Y can be 0.1 mm to 4.0 mm. In alternative embodiments, the distance Y can be any length. In further embodiments, multiple components 270 may be positioned between the collar 134 and the box prong 150 of the grommet 100. As further discussed above, the second component 340 may be secured to the neck 334 of the pin 300 (see FIG. 22). As will be discussed in further detail herein, a seal 370 may be positioned between the first component 270 and the second circular flange 332 of the pin 300 (see FIG. 21). The seal 370 may extend over the collar 134 of the grommet 100 (see FIG. 21).

Referring back to FIG. 9, the grommet 100 is aligned with the slot 350 of the first component 270. However, as discussed above, the grommet 100 does not need to attach to the first component 270 in a specific orientation. Instead, the grommet 100 may be attached within the slot 350 of the first component 270 in any orientation so long as the legs 240 of the body 102 are led into the slot 350 of the first component 270. In particular, the grommet 100 may be rotated about the longitudinal axis A (see arrows C) to any rotational position prior to being inserted into the slot 350 of the first component 270. The openings 202 in the body 102 and the box prong 150 of the grommet 100 allow for the box prong 150 to inwardly flex regardless of the orientation that the grommet 100 is being placed into the slot 350 of the first component 270. Therefore, the operator does not need to orientate the grommet 100 with respect to the rectangular shape of the slot 350. Instead, the operator, in a one-step process, can attach the grommet 100 with or without the pin 300 to the first component 270. Thus, the operator does not need to use additional time to make sure that the grommet 100 is properly aligned with the shape of the slot 350 prior to assembly. Rather, the operator can just simply urge the grommet 100 into the slot 350 of the first component 270 and the box prong 150 will flex to allow the internal edges 352 of the first component 270 to be positioned between the collar 134 and the box prong 150 of the grommet 100.

Figure 14:
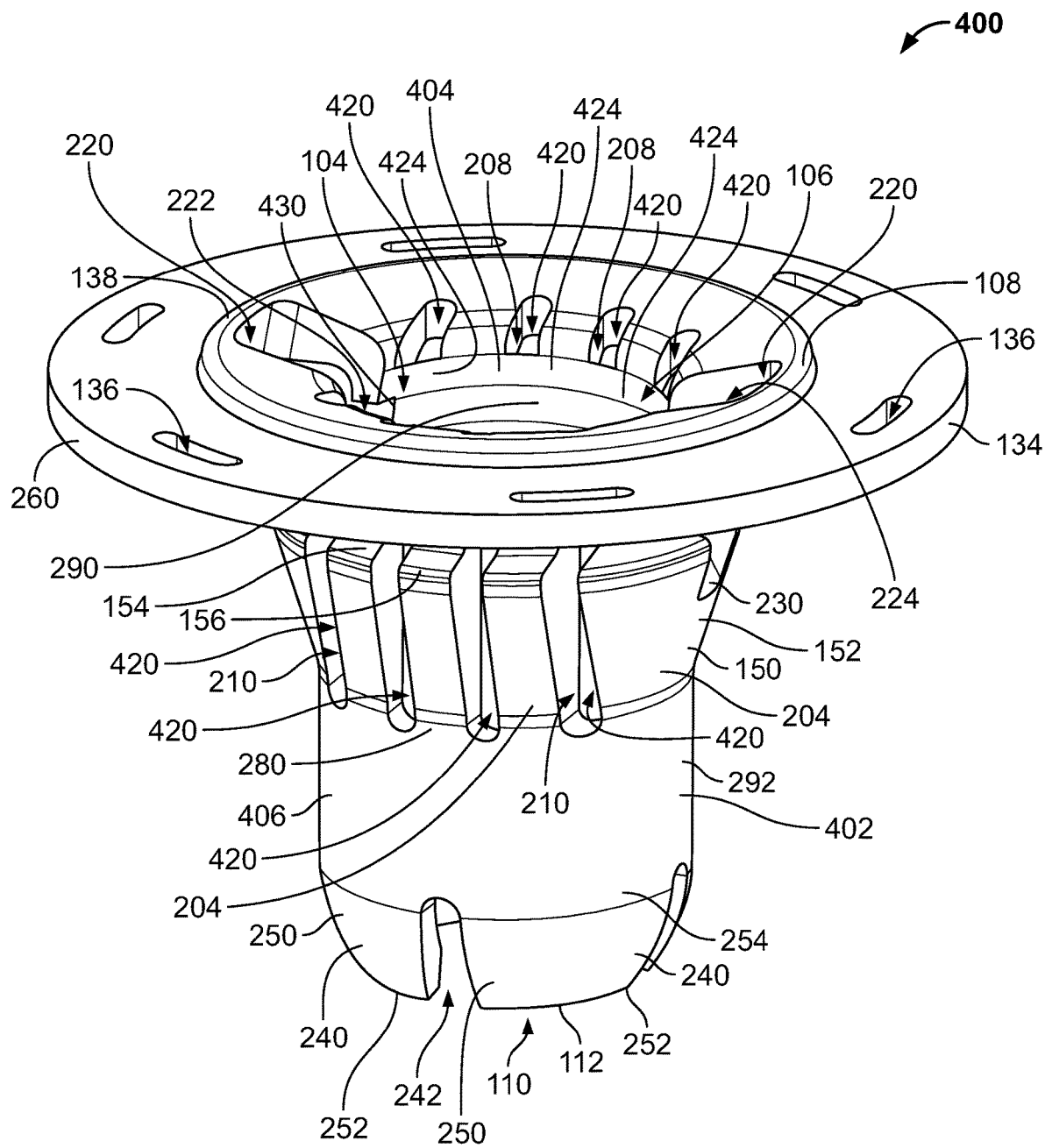
FIG. 14 is a top perspective view of another grommet, according to another embodiment of the present disclosure.

Referring now to FIGS. 14-22, like reference numbers are used with regard to an alternative embodiment of a grommet 400. As noted herein, the grommet 400 is substantially similar to the grommet 100 except for a few differences, which will be explained in detail below. The grommet 400 comprises a round shape when viewed from the top and bottom, and the grommet 400 includes a body 402 that is generally cylindrical. Similar to the grommet 100, the grommet 400 may be integrally molded and formed as a single piece of material such as injection-molded plastic. As illustrated in FIG. 14, the passageway 104 of the grommet 400 is partially defined by an inner surface 404 of a wall 406. The wall 406 is a portion of the body 402 and extends almost the entire length of the grommet 400.

Figure 15:
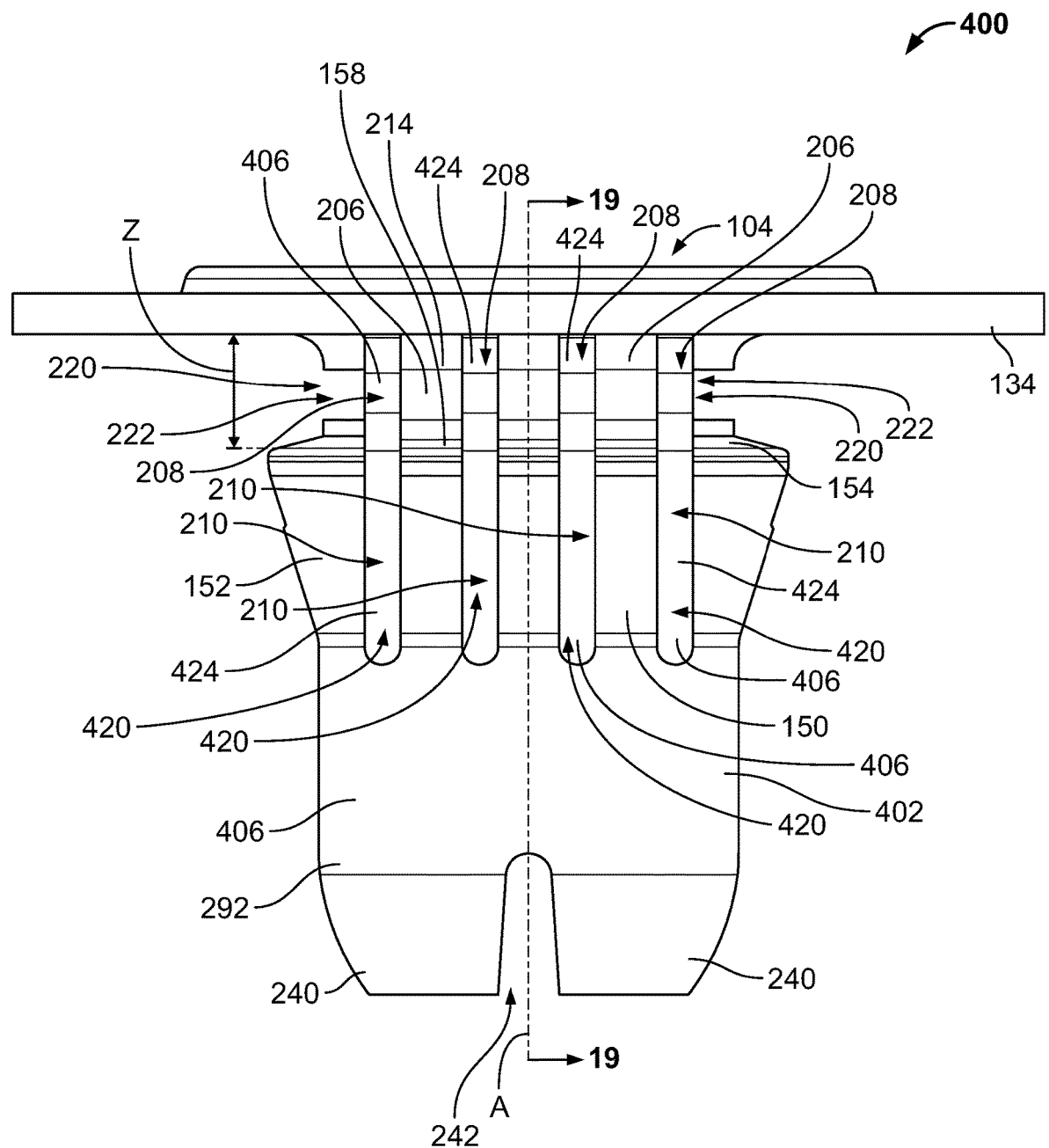
FIG. 15 is a front elevational view of the grommet of FIG. 14.

Referring to FIGS. 14 and 15, a top perspective view and a front view of the grommet 400 are shown, respectively. As illustrated in FIGS. 14 and 15, the grommet 400 comprises a plurality of openings 420 that extend through the box prong 150. The plurality of openings 420 are similar to the openings 202 illustrated in FIGS. 1-7, however, as illustrated in FIGS. 14 and 15, the plurality of openings 420 do not extend entirely through the wall 406 of the body 402. Instead, the plurality of openings 420 stop just short of the passageway 104. As a result, the wall 406 comprises thinned sections 424 where the openings 420 stop. As such, the wall 406 extends around the passageway 104 of the grommet 400 and is not interrupted by the openings 420 (see FIG. 14). Instead, only the windows 220 extend entirely through the wall 406 of the grommet 400. As noted herein, the thinned sections 424 of the wall 406 causes the grommet 400 to be more rigid than the grommet 100. As illustrated in FIG. 15, the top wall 154 of the box prong 150 is located at a distance Z away from the collar 134.

Referring to FIG. 15, the thinned sections 424 of the wall 406 are shown through the plurality of openings 420. The plurality of openings 420 function similar to the openings 202 discussed above, i.e., allow the box prong 150 to flex during installation. As illustrated in FIG. 15, the plurality of openings 420 have a consistent width throughout. Specifically, the top sections 208 and the elongated sections 210 of the openings 420 have a constant width, i.e., W1=W2 (see FIG. 4). However, in alternative embodiments, the width of the top section 208 and/or the elongated section 210 may be wider or longer than shown. In some embodiments, the openings 420 may extend entirely through the wall 406 and into the passageway 104, similar to the openings 202. In further embodiments, the openings 420 may comprise a different configuration or shape than shown. Therefore, similar to the openings 202, the openings 420 may comprise a variety of configurations, shapes, lengths, and orientations.

Figure 16:
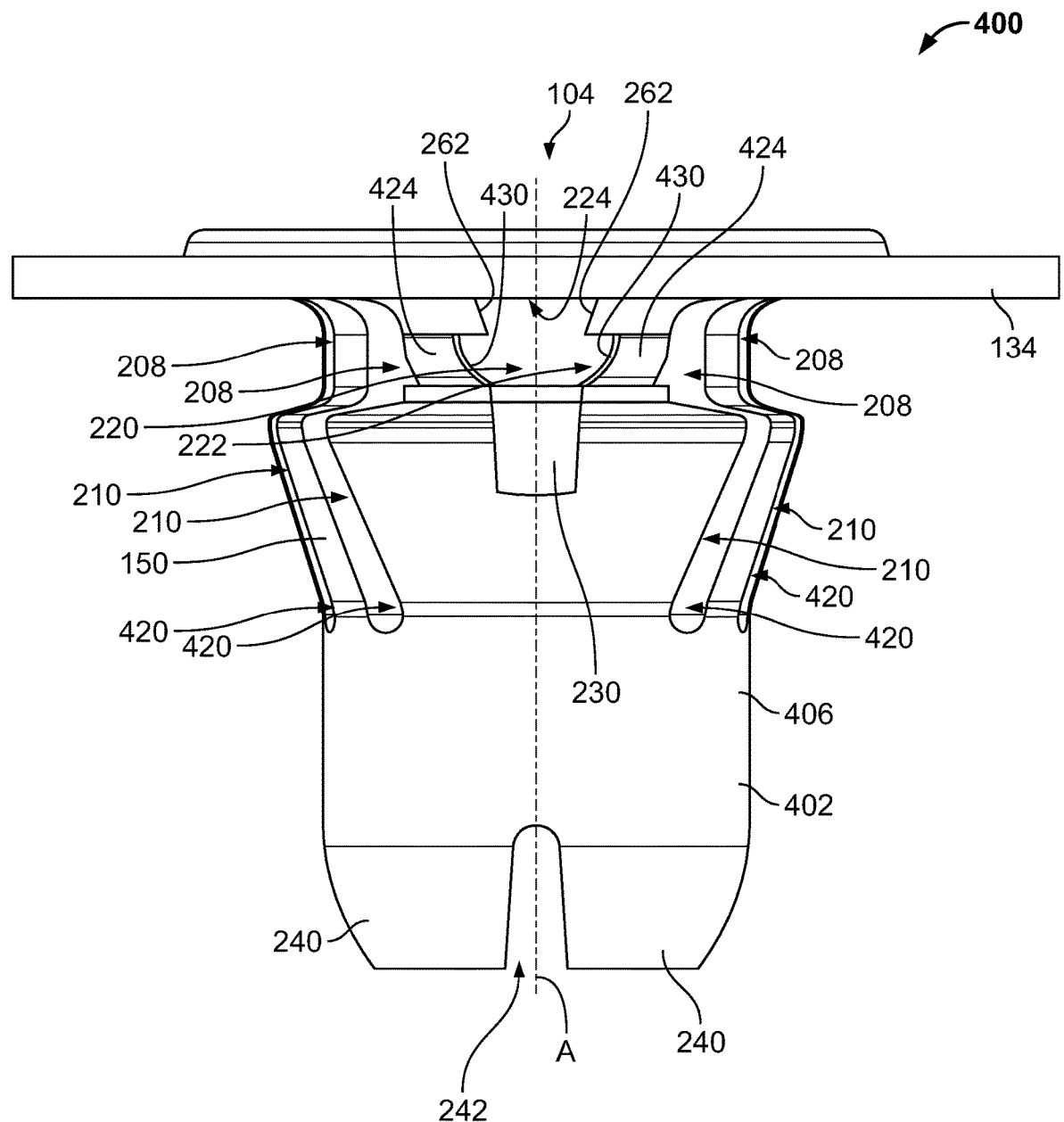
FIG. 16 is a side elevational view of the grommet of FIG. 14.

Referring to FIG. 16, a side view of the grommet 400 is shown. As illustrated in FIG. 16, the windows 220 extend through the thinned section 424 of the wall 406. In particular, the thinned section 424 of the wall 406 comprises curved edges 430 that extend outwardly from the box prong 150 and define edges of the windows 220. As illustrated in FIGS. 15 and 16, the central segment 222 of the windows 220 extends into the openings 420. Put differently, the portion 228 of the wall 406 is removed from the grommet 400 (see FIG. 4).

Figure 17:
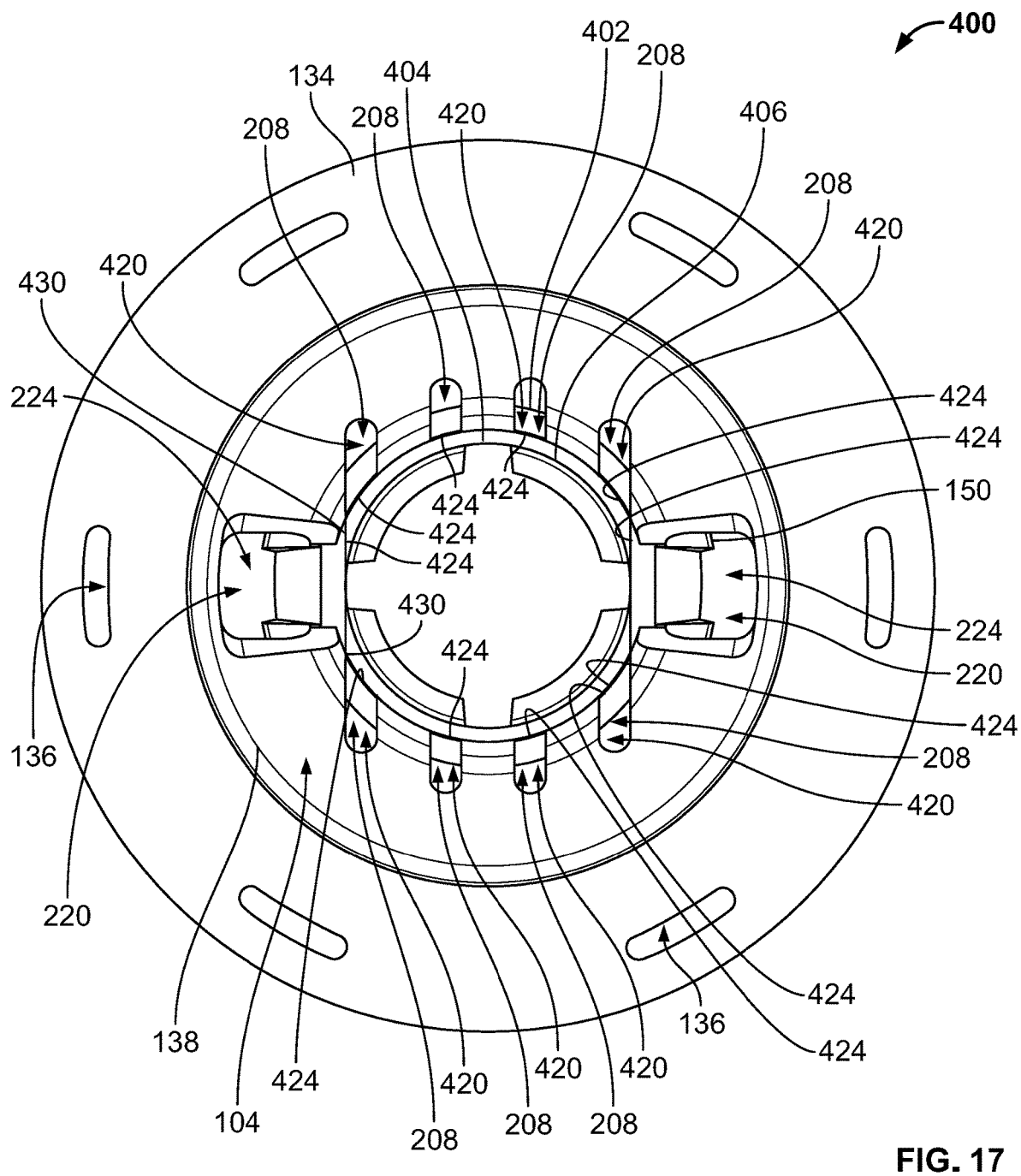
FIG. 17 is a top plan view of the grommet of FIG. 14.
Figure 18:
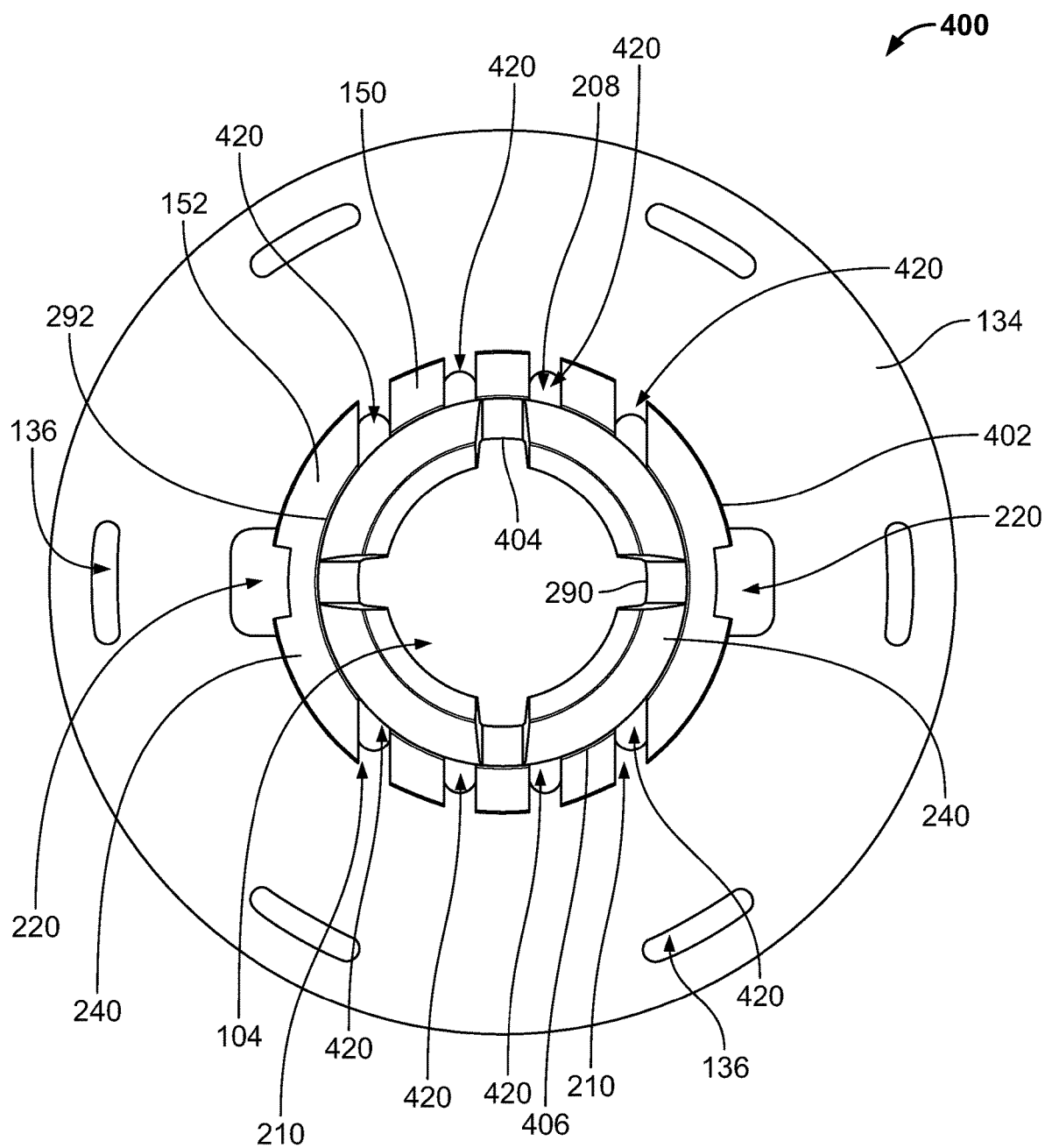
FIG. 18 is a bottom plan view of the grommet of FIG. 14.

Referring to FIGS. 17 and 18, a top plan view and a bottom plan view of the grommet 400 are shown, respectively. As illustrated in FIG. 17, the top section 208 of the openings 420 extend into a portion of the collar 134 near the flange 138, and the top section 208 of the openings 420 comprise a similar width as the elongated section 210 of the openings 420 (see FIG. 15). Further, the thinned sections 424 of the wall 406 are shown extending around the passageway 104.

Figure 19:
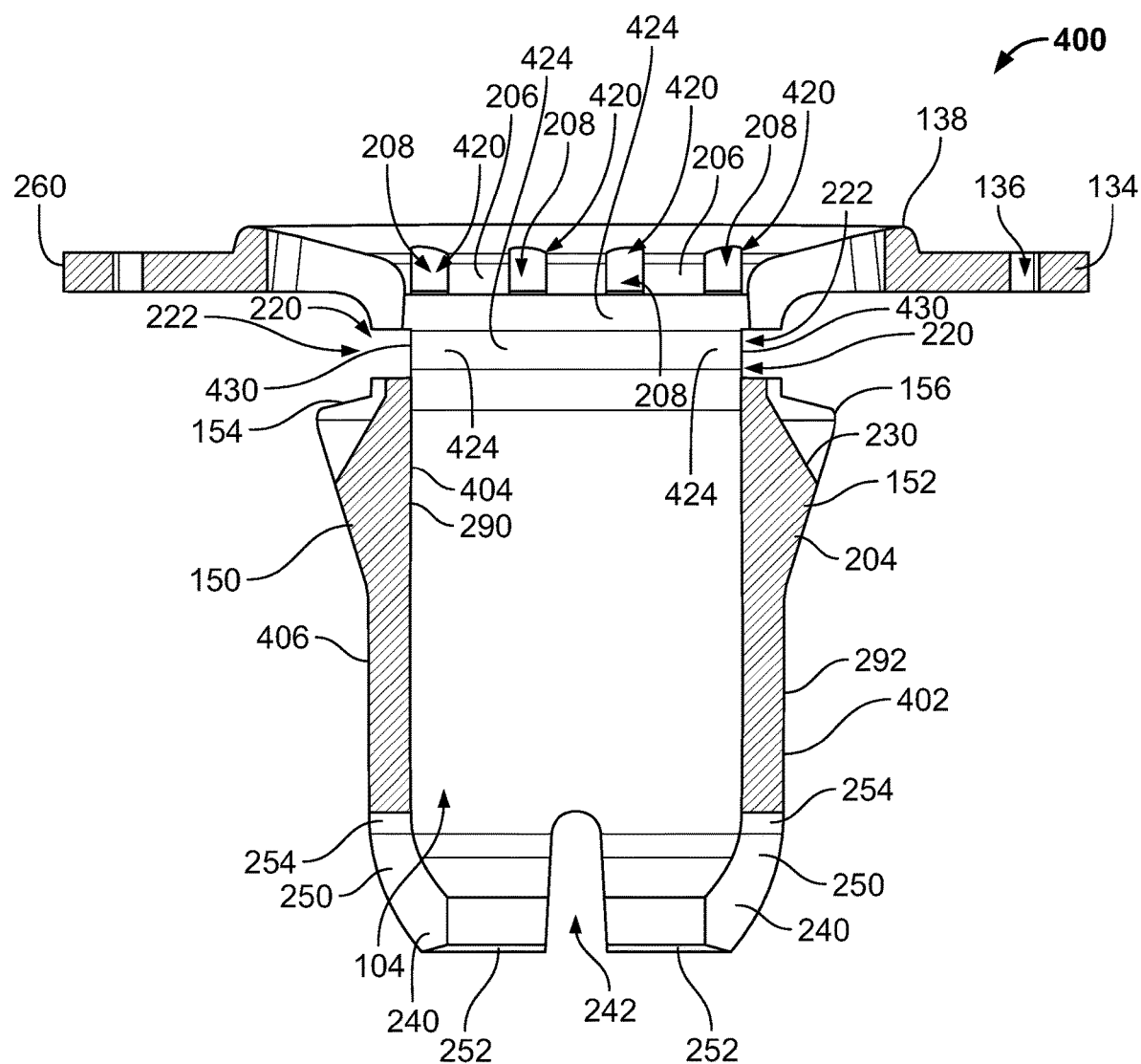
FIG. 19 is a cross-sectional view taken through line 19-19 of FIG. 15.

Referring to FIG. 19, a cross sectional view of the grommet 400 is shown. As illustrated in FIG. 19, the thinned sections 424 of the wall 406 is shown extending over the openings 420. However, a small portion of the top section 208 of the openings 420 extends into the passageway 104. Further, the box prong 150 of the grommet 400 does not comprise the supports 272 (see FIG. 4).

Figure 20:
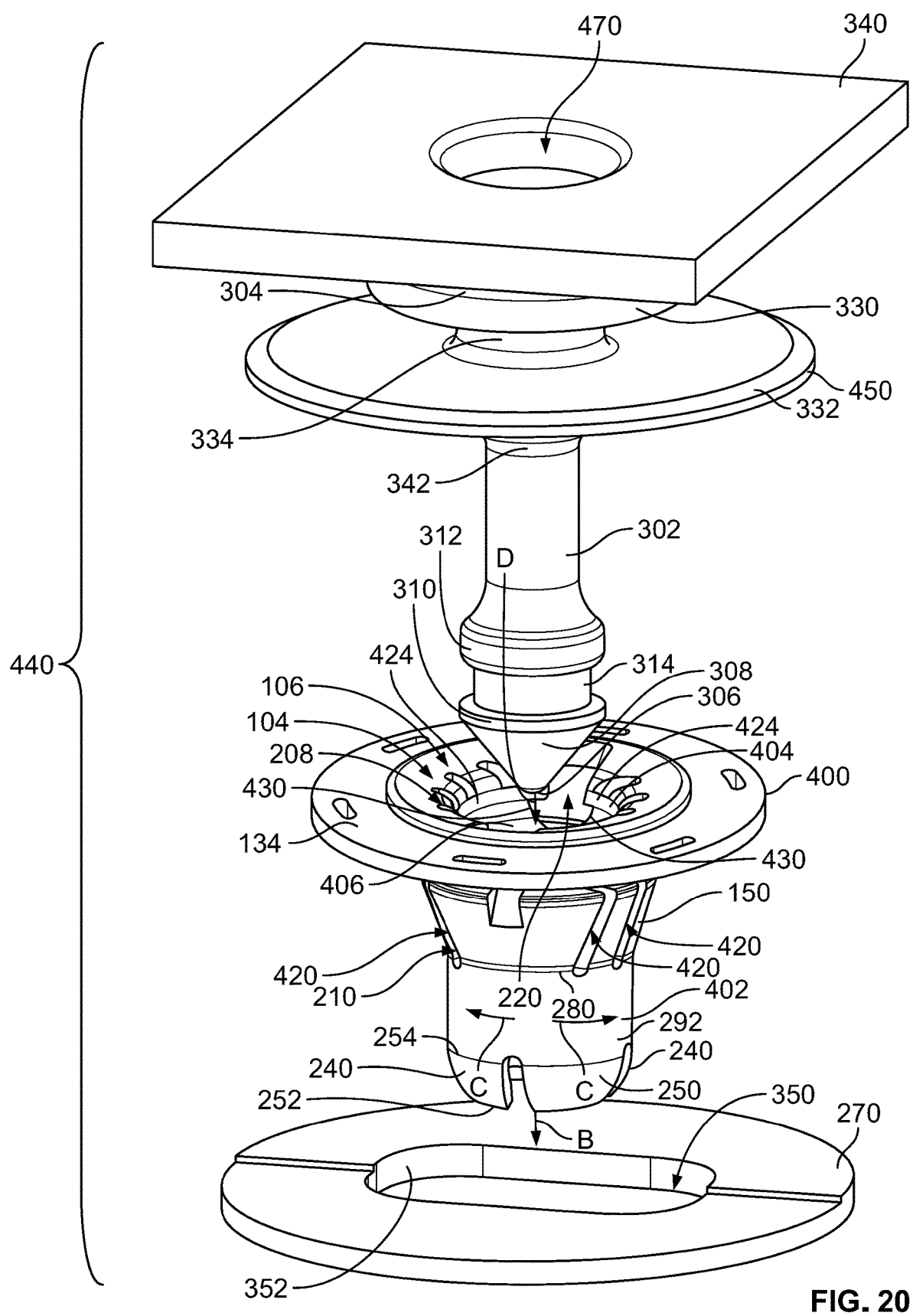
FIG. 20 is an exploded view of a fastening system.

Referring to FIG. 20, an exploded view of a fastening system 440 is shown. In particular, the grommet 400 is aligned with the first component 270, a pin 450, and the second component 340. Like reference numbers are used with regard to an alternative embodiment of the pin 450. As noted herein, the grommet 400, the first component 270, the pin 450, and the second component 340 comprise the fastening system 440. As illustrated in FIG. 20, the grommet 400 is aligned with the slot 350 of the first component 270 and the pin 450 is aligned above the upper opening 106 of the passageway 104 of the grommet 400. As further noted herein, the pin 450 is substantially similar to the pin 300 described above with respect to FIGS. 8 and 10-13. However, as illustrated in FIG. 20, the rib 312 does not comprise any reinforcements 316 as described above with respect to the pin 300. It is contemplated that the pin 450 or the pin 300 (see FIG. 8) may be used with the grommet 400.

Referring still to FIG. 20, the second component 340 is shown above the pin 450. As illustrated in FIG. 20 the second component 340 comprises a hole 470 that extends therethrough. The hole 470 may comprise any type of shape or configuration. Additionally, it is contemplated that the second component 340 may comprise any size, thickness, or configuration. Further, the second component 340 can be any shape and may comprise any type of panel, such as a plastic panel, an aluminum panel, or a metal panel, for example. The second component 340 is configured to sit between the first circular flange 330 and the second circular flange 332 of the pin 450, and the neck 334 of the pin 450 is configured to extend through the hole 470 of the second component 340. It is further contemplated that the second component 340 may be attached to the pin 450 in any process known to one of ordinary skill in the art.

As noted herein, the grommet 400 can be installed on the first component 270 in the same way as described above with respect to the grommet 100. Therefore, the grommet 400 is capable of being inserted in any rotational positon about the longitudinal axis A (see FIG. 16) into the first component 270. Further, the pin 450 may be inserted into the grommet 400 in the same way as described above with respect to the pin 300 and the grommet 100, and the pin 450 may be removably attached to the grommet 400 as described above.

Figure 21:
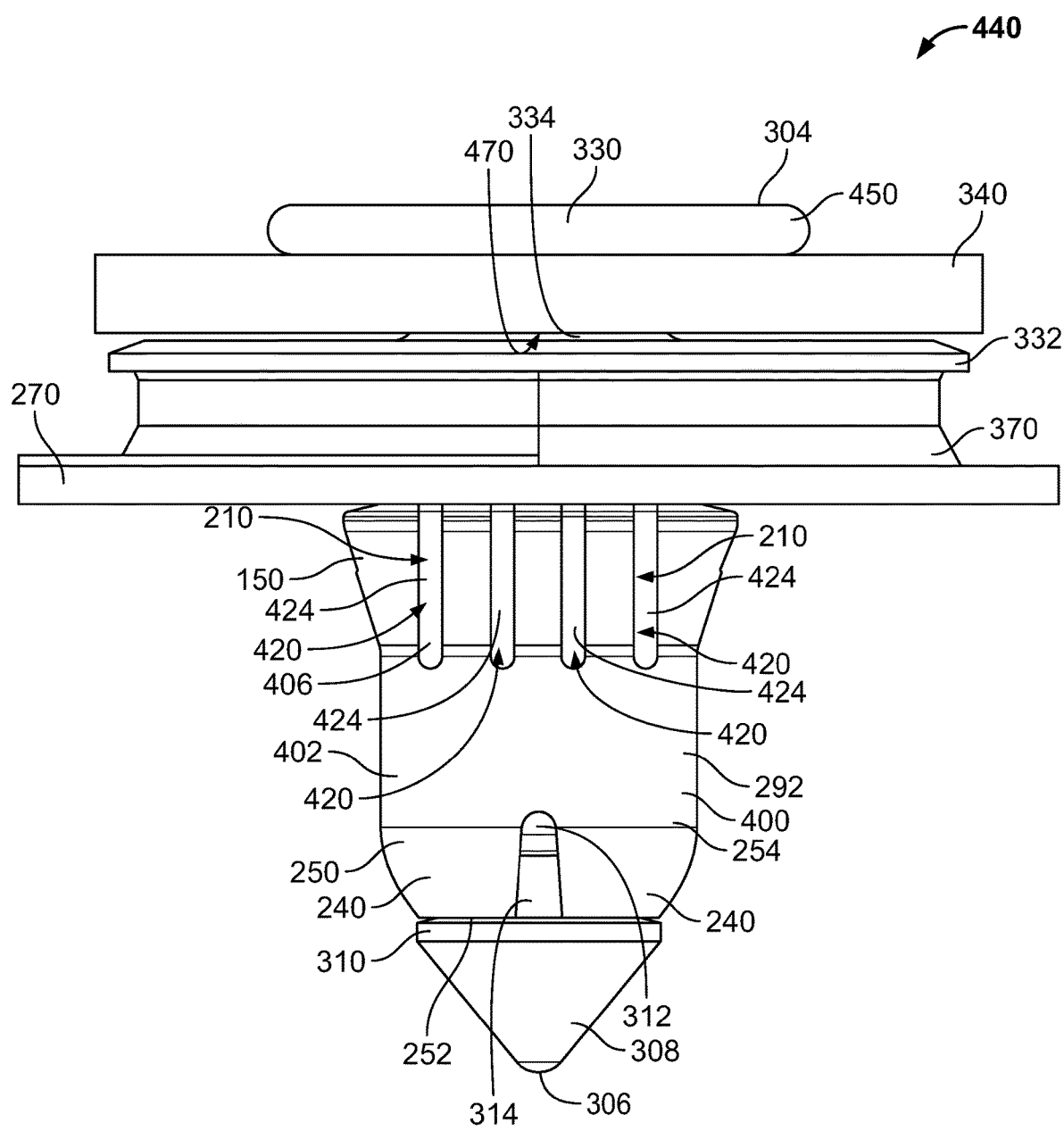
FIG. 21 is a front elevational view of the fastening system of FIG. 20 secured to a seal.
Figure 22:
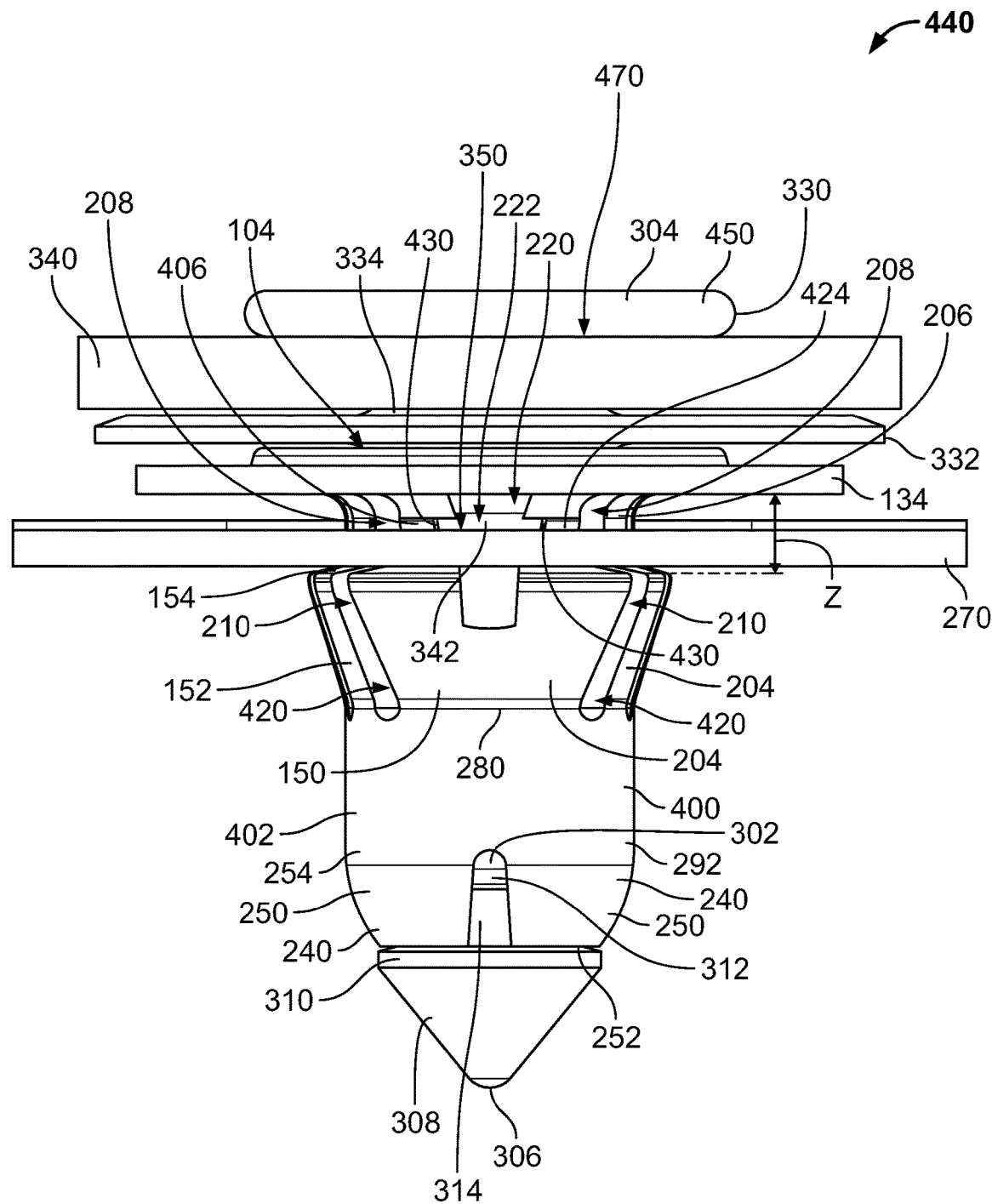
FIG. 22 is a side elevational view of the fastening system of FIG. 20.
Figure 23:
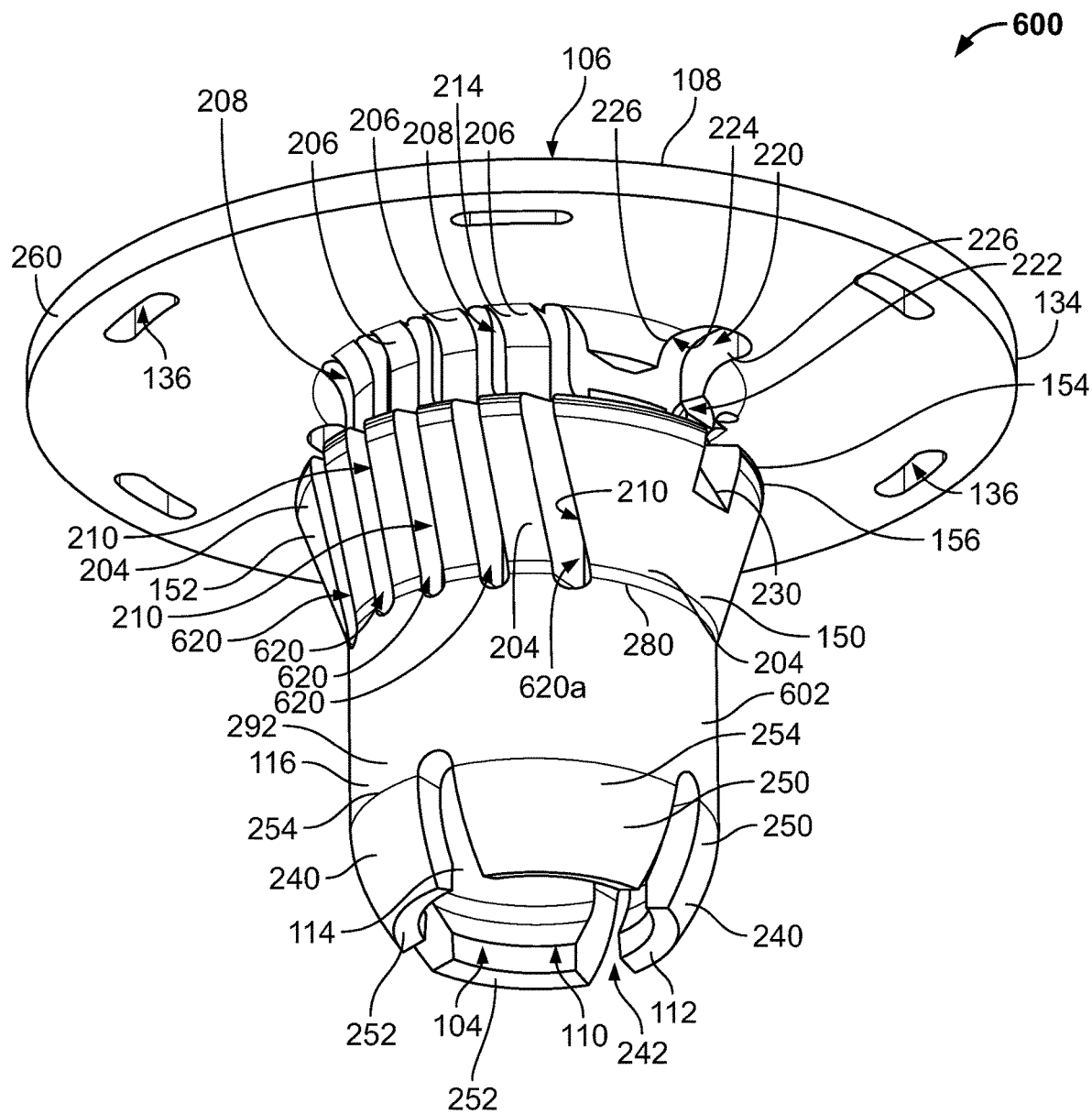
FIG. 23 is a bottom perspective view of another grommet, according to yet another embodiment of the present disclosure.

Referring to FIGS. 21 and 22, various views of the fastening system 440 are shown with and without the seal 370. In particular, the grommet 400 is attached to the pin 450 and the first component 270. Additionally, the second component 340 is secured to the pin 450. As illustrated in FIG. 21, the seal 370 is placed between the first component 270 and the second circular flange 332. The seal 370 may extend over the collar 134 of the grommet 400 and may extend through the plurality of elongated apertures 136 in the collar 134. The seal 370 further assists the grommet 400 in providing a seal between the first component 270 and the second component 340. Further, the seal 370 limits water or debris from getting into the grommet 400. It is contemplated that the grommet 100 may also include the seal 370 in the installed configuration. As further illustrated in FIG. 21, the second component 340 is positioned around the neck 334 of the pin 450 and between the first and second circular flanges 330, 332.

Referring to FIG. 21, depending on the thickness of the first component 270, the distance Z between the top wall 154 of the box prong 150 and the collar 134 may vary to accommodate the thickness of the first component 270 and/or the seal 370 (see FIG. 15). Therefore, if a thicker or thinner first component 270 is used, the distance Z may be increased or decreased such that the first component 270 and/or the seal 370 is/are able to fit between the top wall 154 of the box prong 150 and the collar 134. In preferred embodiments, the distance Z can be 0.1 mm to 4.0 mm.

Referring now to FIGS. 23-28, like reference numbers are used with regard to an alternative embodiment of a grommet 600. As noted herein, the grommet 600 is substantially similar to the grommets 100, 400 except for a few differences, which will be explained in detail below. The grommet 600 comprises a round shape when viewed from the top and bottom, and the grommet 600 includes a body 602 that is generally cylindrical. Similar to the grommets 100, 400, the grommet 600 may be integrally molded and formed as a single piece of material such as injection-molded plastic.

Figure 24:
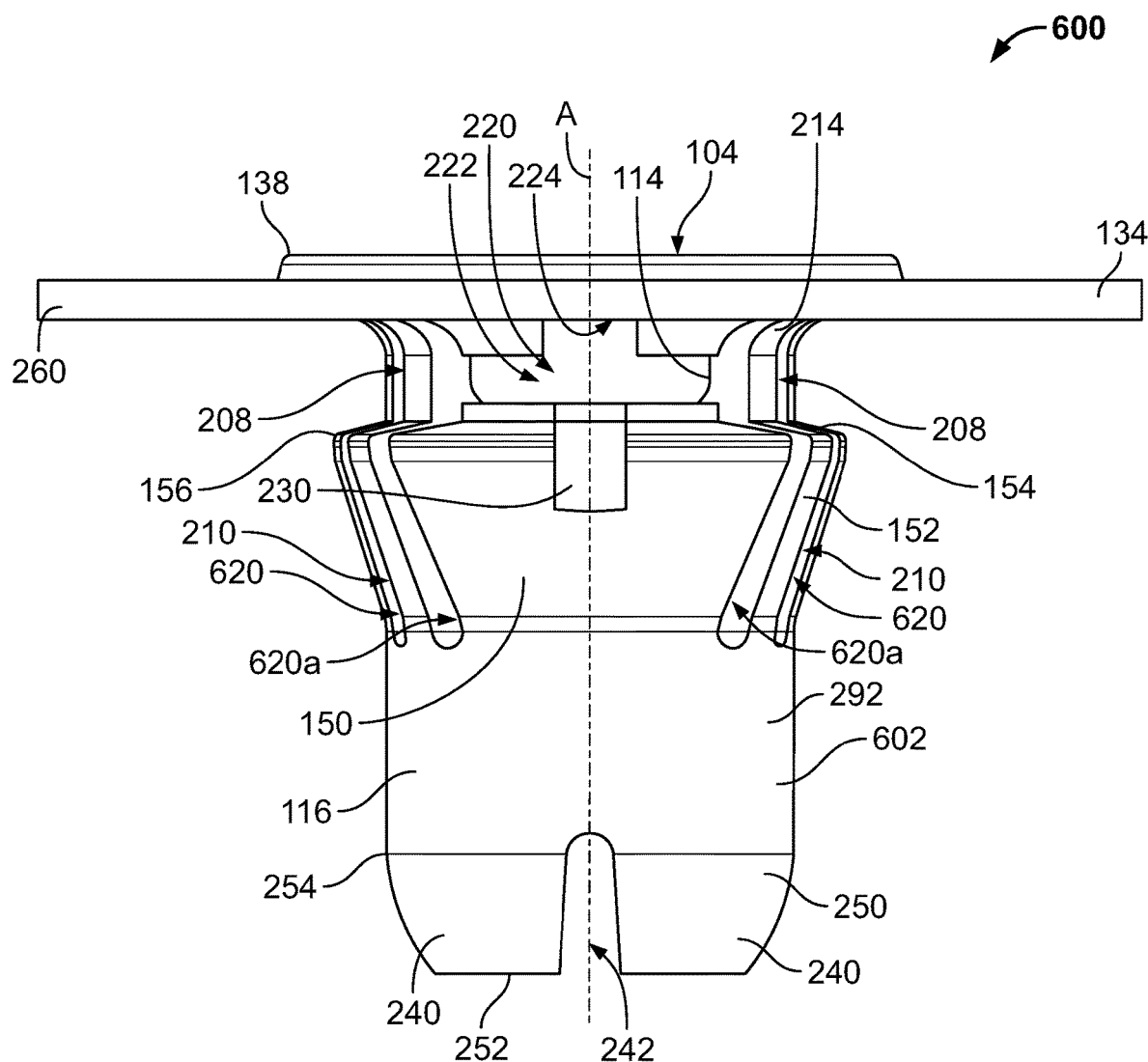
FIG. 24 is a side elevational view of the grommet of FIG. 22.
Figure 25:
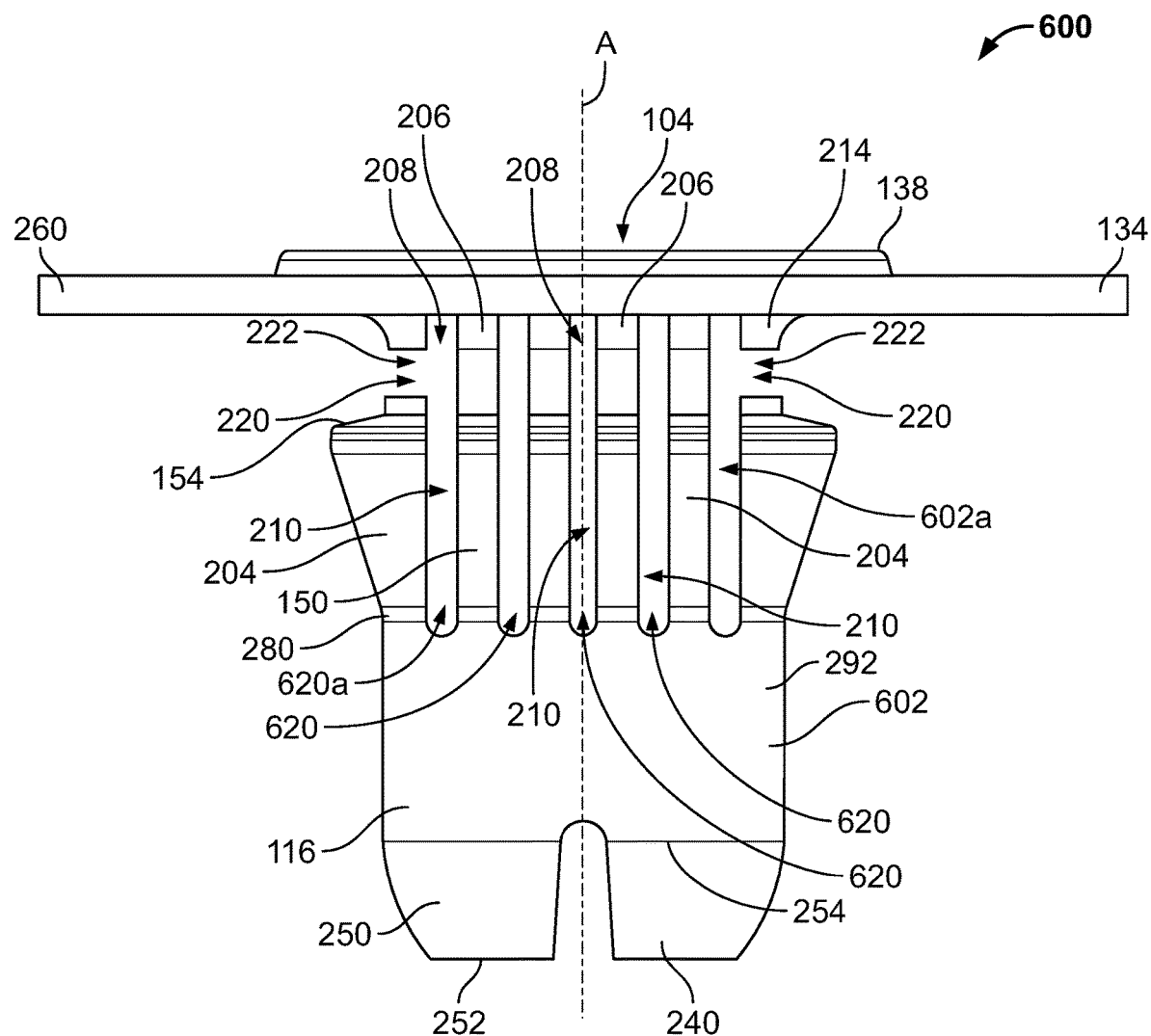
FIG. 25 is a front elevational view of the grommet of FIG. 22.

Referring to FIGS. 23-26, various views of the grommet 600 are shown. As illustrated in FIG. 25, the grommet 600 comprises a plurality of openings 620 that extend through the box prong 150 and the wall 116 of the body 602. Similar to the openings 202, as illustrated in FIG. 4, the openings 620 extend entirely through the body 602. The plurality of openings 620 also comprise a consistent width throughout. In particular, the top section 208 and the elongated section 210 comprise the same width. In alternative embodiments, the openings 620 may comprise a different configuration or shape than shown. Therefore, similar to the openings 202, the openings 620 may comprise a variety of configurations, shapes, lengths, and orientations.

Referring to FIG. 25, the grommet 600 comprises five openings 620 on both sides of the grommet 600. In some embodiments, there can be more or fewer openings 620 on the grommet 600 than shown. As noted herein, the openings 620 are substantially similar and function the same as the plurality of openings 202 described above. Therefore, the openings 620 help allow the box prong 150 to flex during installation of the grommet 600.

Figure 26:
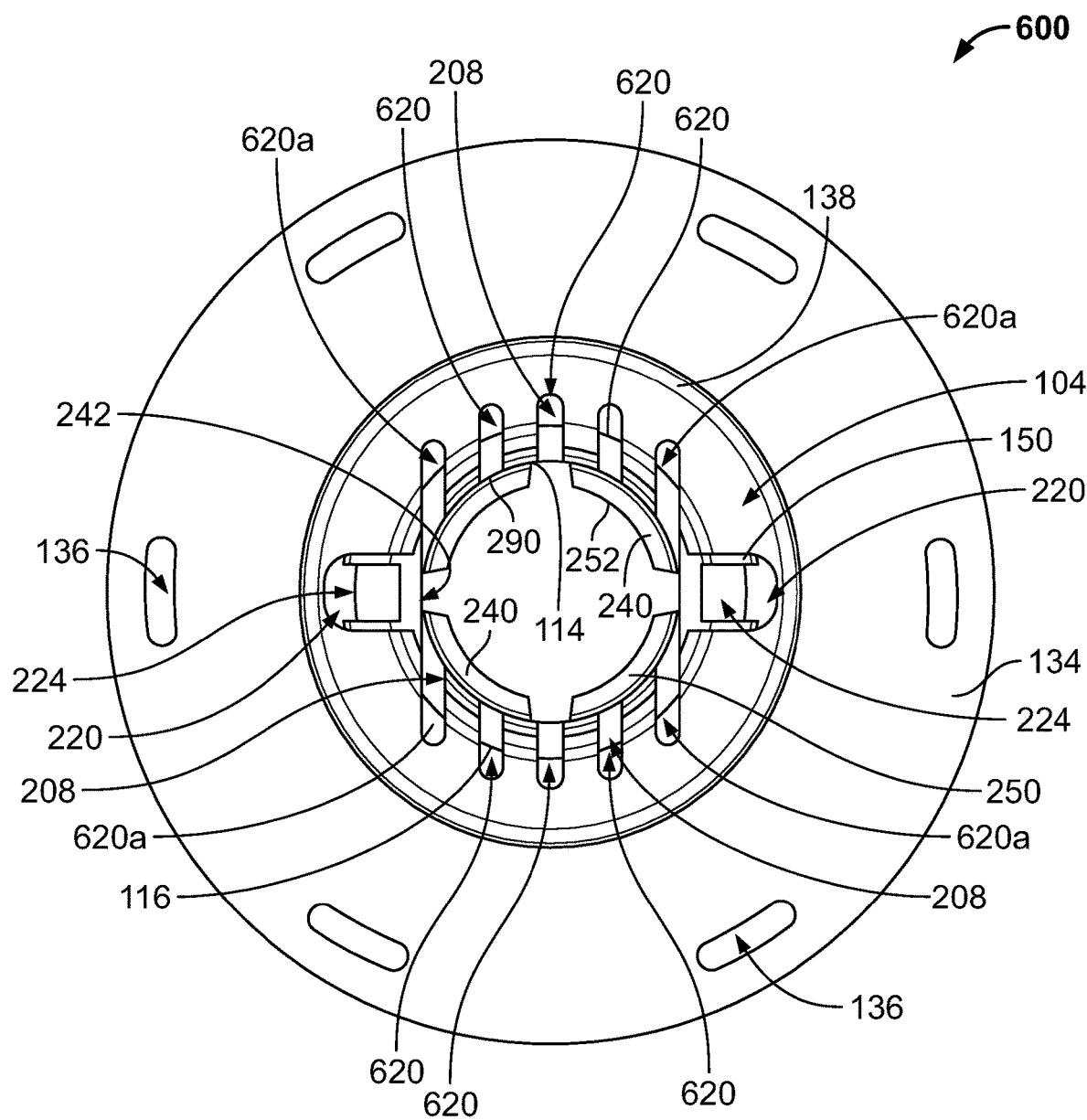
FIG. 26 is a top plan view of the grommet of FIG. 22.

Referring to FIGS. 24 and 25, the windows 220 extend into outer openings 620a. As such, the grommet 600 does not comprise the portion 228 of the wall 116 (see FIG. 4). As illustrated in FIG. 24, the top wall 154 of the box prong 150 forms a corner with the wall 116. Further, as illustrated in FIG. 25, the box prong 150 does not comprise the supports 272 (see FIG. 4). As illustrated in FIG. 26, the top section 208 of the openings 620 extend into the collar 134 and comprise a similar width as the elongated section 210. Additionally, the top portion 224 of the windows 220 are substantially smaller in the grommet 600 than the grommets 100, 400 (see FIGS. 5 and 17).

Figure 27:
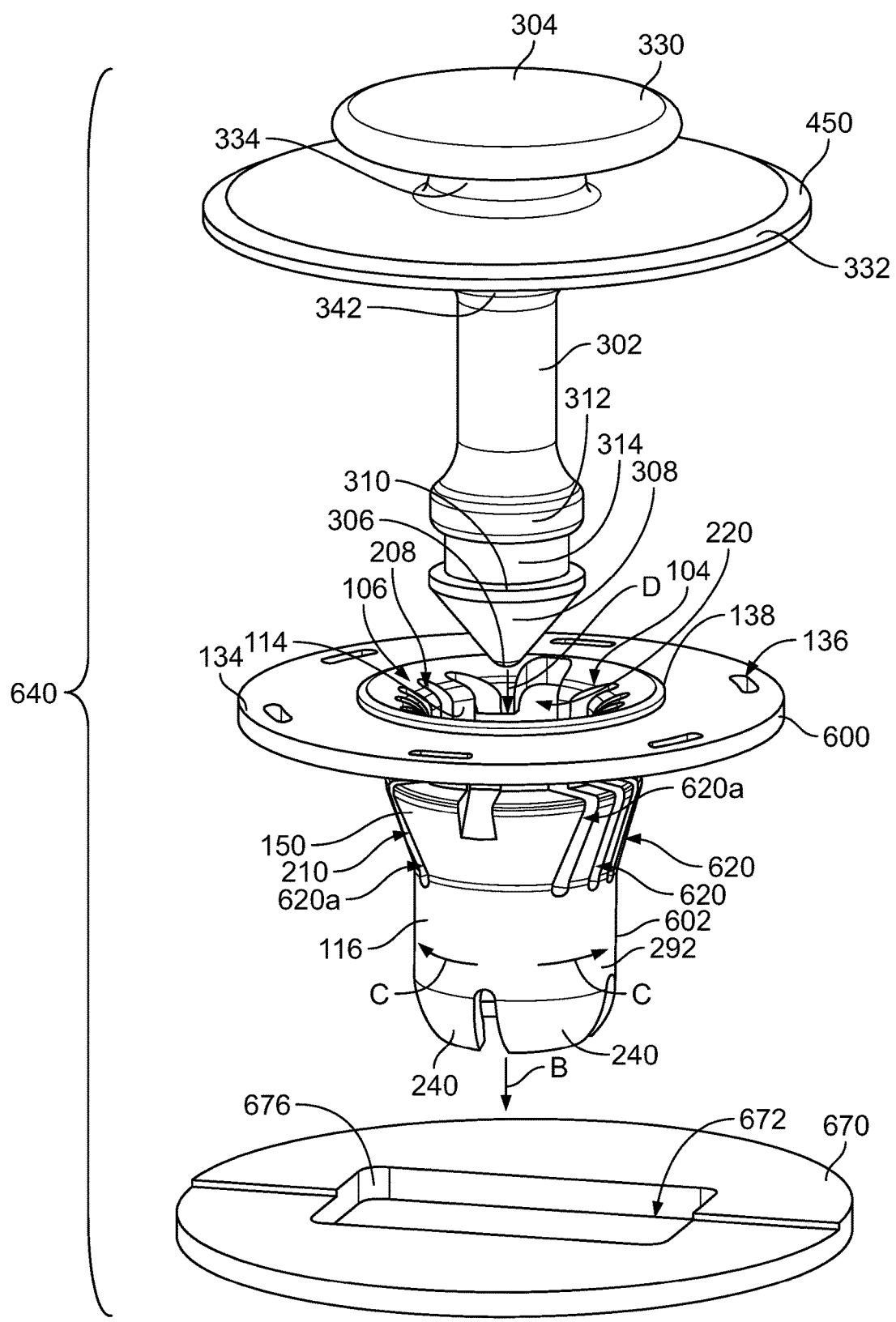
FIG. 27 is an exploded view of a fastening system.

Referring to FIG. 27, an exploded view of a fastening system 640 is shown. In particular, the grommet 600 is aligned with a first component 670 and the pin 450. As noted herein, the grommet 600, the first component 670, and the pin 450 comprise the fastening system 640. As illustrated in FIG. 27, the first component 670 comprises a slot 672 extending through the first component 670. The slot 672 comprises a generally rectangular shape, and the slot 672 is defined by internal edges 676 of the first component 670. As further illustrated in FIG. 27, the grommet 600 is aligned with the slot 672 of the first component 670 and the pin 450 is aligned above the upper opening 106 of the passageway 104 of the grommet 600. It is contemplated that either pin 300, 450 may be used with the grommet 600 and the first component 670.

As noted herein, the grommet 600 can be installed into the first component 670 in the same way as described above with respect to the grommets 100, 400. Therefore, similar to the grommets 100, 400, the grommet 600 is capable of being inserted in any rotational position about the longitudinal axis A into the first component 670. Further, the pin 450 may be inserted into the grommet 600 in the same way as described above with respect to the grommet 100, and the pin 450 may be removably attached to the grommet 600 as described above.

Figure 28:
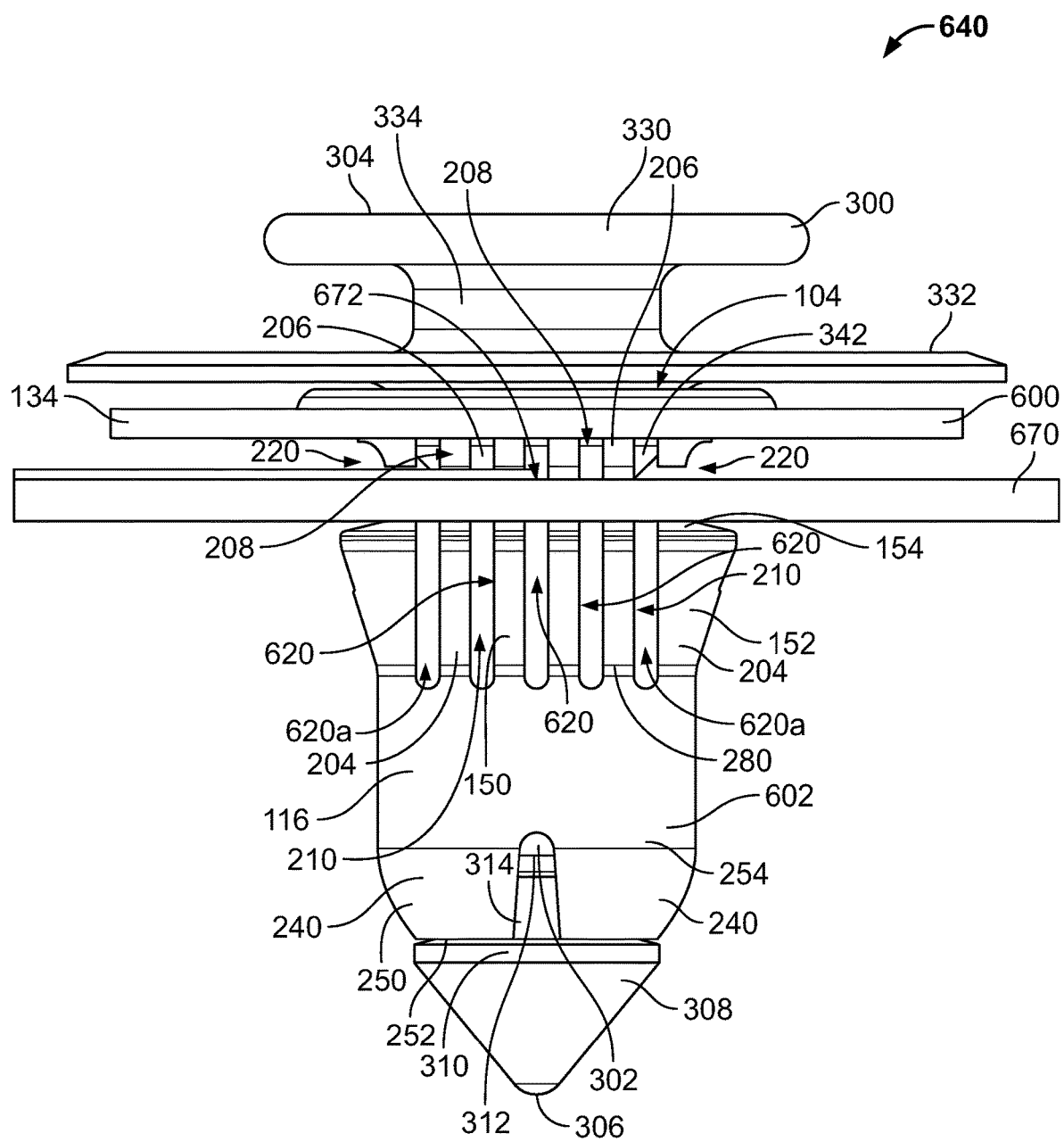
FIG. 28 is a front elevational view of the fastening system of FIG. 27.

Referring to FIG. 28, a front view of the fastening system 640 is shown. In particular, the grommet 600 is attached to the pin 450 and the first component 670. As illustrated in FIG. 28, the first component 670 is positioned between the top wall 154 of the box prong 150 and the collar 134. As discussed above with respect to the grommets 100, 400, it is contemplated that the distance between the top wall 154 and the collar 134 of the grommet 600 may be greater or smaller than shown. In some embodiments, the seal 370 may be used with the grommet 600 (see FIG. 21).

As noted herein, the grommets 100, 400, 600 are interchangeable and may be used with any of the pins 300, 450 or first components 270, 670 described above. Further, any of the components/structure described with respect to one of the grommets 100, 400, 600 may be implemented in a different grommet 100, 400, 600. Therefore, the grommets 100, 400, 600 may have various configurations. As further noted herein, the grommets 100, 400, 600 are symmetrical. Therefore, the front and rear views are identical and the right and left side views are identical.

As described above, the grommets 400, 600 are capable of being installed into the first components 270, 670 in the same way as outlined above with respect to the grommet 100. Therefore, the openings 420, 620 in the body 402, 602 and the box prong 150 of the grommets 400, 600 allow for the box prong 150 to inwardly flex regardless of the orientation that the grommet 400, 600 is placed into the slot 350, 672 of the first component 270, 670. As such, the operator does not need to orientate the grommet 400, 600 with respect to the rectangular shape of the slot 350, 672. Instead, the operator, in a one-step process, can attach the grommet 400, 600 with or without the pin 450 to the first component 270, 670. Thus, the operator does not need to use additional time to make sure that the grommet 400, 600 is properly aligned with the shape of the slot 350, 672 prior to assembly. Rather, the operator can just simply urge the grommet 400, 600 into the slot 350, 672 of the first component 270, 670 and the box prong 150 will flex to allow the internal edges 352, 676 of the first component 270, 670 to be positioned between the collar 134 and the box prong 150 of the grommet 400, 600.

From the foregoing, it will be appreciated that the grommets 100, 400, 600 eliminate the need to orientate the grommet 100, 400, 600 with the slot 350, 672 during installation. Typical fasteners or grommets for use with non-circular slots require a specific rotational positon prior to being inserted into a panel. In contrast, the grommets 100, 400, 600 may be inserted into a non-circular slot in any rotational position about the longitudinal axis A. Thus, the grommets 100, 400, 600 greatly reduce the time and complexity of installation. Furthermore, the openings 202, 420, 620 and the windows 220 in the grommets 100, 400, 600 allow the grommets 100, 400, 600 to be more flexible and to have a lower installation force.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

As noted previously, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

I claim:

1. A grommet, comprising:
   a body defining a longitudinal axis and having a passageway therein;
   a collar extending from the body and away from the longitudinal axis; and
   a box prong extending circumferentially around the body, wherein a plurality of openings extend through the body and the box prong at diametrically opposed sides, and wherein the grommet is configured to attach within a slot of a component in any rotational orientation about the longitudinal axis.

2. The grommet of claim 1, wherein the plurality of openings are aligned with each other on the diametrically opposed sides of the grommet.

3. The grommet of claim 1, wherein the plurality of openings extend into the passageway of the body.

4. The grommet of claim 1, wherein the grommet comprises four openings on each of the diametrically opposed sides of the body.

5. The grommet of claim 1, wherein the box prong comprises an angled wall that extends from the body, and wherein the angled wall extends radially outward from the body and longitudinally toward the collar.

6. The grommet of claim 5, wherein the box prong further comprises a top wall that extends radially outward and downward from the body.

7. The grommet of claim 5, wherein the box prong comprises a generally frusto-conical shape, and wherein a diameter of the box prong increases as the box prong extends upwardly toward the collar.

8. The grommet of claim 1, wherein the plurality of openings extend along a longitudinal direction of the grommet.

9. A grommet, comprising:
   a body defining a longitudinal axis and having an inner wall;
   a collar extending from the body and away from the longitudinal axis;
   a box prong extending partially around the body, wherein the box prong is configured to flex inwardly toward the longitudinal axis; and
   a plurality of openings extending through the box prong and the body at diametrically opposite sides, wherein each of the plurality of openings are aligned with each other on the diametrically opposite sides of the body, wherein the grommet is configured to attach within a non-circular slot of a component in any rotational orientation about the longitudinal axis.

10. The grommet of claim 9, wherein the body of the grommet comprises windows at diametrically opposed sides of the body.

11. The grommet of claim 10, wherein the windows extend through the collar and the body of the grommet.

12. The grommet of claim 9, wherein each of the plurality of openings comprises a top section and an elongated section, wherein the top section is positioned longitudinally above the elongated section.

13. The grommet of claim 12, wherein a width of each of the top sections is wider than a width of each of the elongated sections.

14. The grommet of claim 12, wherein the top section of the openings extends into an upper end of the grommet.

15. A fastening system, comprising:
   a grommet, including:
      a body defining a longitudinal axis and having a passageway therein;
      a collar extending radially outward from an upper end of the body;
      a box prong extending outwardly from the body, the box prong having a generally frusto-conical shape such that a diameter of the box prong increases as the box prong extends upwardly toward the collar; and
      a plurality of openings extending through at least the box prong at diametrically opposite sides; and
   a first component comprising a slot extending therethrough,
   wherein the grommet is configured to attach within the slot of the first component in any rotational orientation about the longitudinal axis.

16. The fastening system of claim 15, wherein the slot of the first component is a non-circular slot.

17. The fastening system of claim 15, wherein the fastening system further comprises a pin configured to slide through the passageway of the body.

18. The fastening system of claim 17, wherein the pin is removably attached to the grommet.

19. The fastening system of claim 17, wherein the pin includes a first circular flange and a second circular flange near a top end of the pin, and wherein a second component is configured to be fixed between the first circular flange and the second circular flange.

20. The fastening system of claim 15, wherein the box prong is configured to flex inwardly toward the longitudinal axis during installation.

* * * * *